(12) United States Patent
Glickfield et al.

(10) Patent No.: US 10,110,674 B2
(45) Date of Patent: Oct. 23, 2018

(54) METHOD AND APPARATUS FOR SYNCHRONIZING DATA INPUTS GENERATED AT A PLURALITY OF FREQUENCIES BY A PLURALITY OF DATA SOURCES

(71) Applicant: QUALCOMM Incorporated, San Diego, CA (US)

(72) Inventors: Sarah Glickfield, St. Louis, MO (US); Isaac David Guedalia, Beit-Shemesh (IL); Adam Schwartz, Beit-Shemesh (IL)

(73) Assignee: QUALCOMM Incorporated, San Diego, CA (US)

( * ) Notice: Subject to any disclaimer, the term of this patent is extended or adjusted under 35 U.S.C. 154(b) by 568 days.

(21) Appl. No.: 14/789,005

(22) Filed: Jul. 1, 2015

(65) Prior Publication Data

US 2016/0044102 A1 Feb. 11, 2016

Related U.S. Application Data

(60) Provisional application No. 62/035,613, filed on Aug. 11, 2014.

(51) Int. Cl.
  *G06F 17/30* (2006.01)
  *H04L 29/08* (2006.01)
  *G06F 13/38* (2006.01)

(52) U.S. Cl.
  CPC ........ *H04L 67/1095* (2013.01); *G06F 13/385* (2013.01); *G06F 17/30324* (2013.01)

(58) Field of Classification Search
  CPC .............................................. G06F 17/30324

USPC ......................................................... 707/611
See application file for complete search history.

(56) References Cited

U.S. PATENT DOCUMENTS

| | | | |
|---|---|---|---|
| 8,229,470 B1* | 7/2012 | Ranjan | H04W 4/029 455/456.3 |
| 8,386,499 B2* | 2/2013 | Martinez | G06F 17/30292 707/755 |
| 9,326,698 B2* | 5/2016 | Blanco | A61B 5/048 |
| 9,336,484 B1* | 5/2016 | Iverson | G06F 17/30539 |
| 2006/0106797 A1* | 5/2006 | Srinivasa | G06F 17/30539 |

(Continued)

OTHER PUBLICATIONS

International Search Report and Written Opinion—PCT/US2015/041918—ISA/IPO—dated Oct. 9, 2015.

*Primary Examiner* — Mark E Hershley
(74) *Attorney, Agent, or Firm* — Muncy, Geissler, Olds & Lowe, P.C.

(57) ABSTRACT

Methods and apparatuses are disclosed for synchronizing data inputs generated at a plurality of frequencies by a plurality of data sources. A device receives a first set of data points from a first data source of the plurality of data sources generated at a first frequency of the plurality of frequencies, receives a second set of data points from a second data source of the plurality of data sources generated at a second frequency of the plurality of frequencies, selects a time window corresponding to a period of time during which at least a subset of the first set of data points and at least a subset of the second set of data points were generated, and generates a vector representing a first reduced form of the subset of the first set of data points and a second reduced form of the subset of the second set of data points.

30 Claims, 14 Drawing Sheets

(56) References Cited

U.S. PATENT DOCUMENTS

| | | | |
|---|---|---|---|
| 2008/0054072 A1* | 3/2008 | Katragadda | G08G 1/123 235/384 |
| 2009/0043646 A1* | 2/2009 | Pingali | G06F 11/3409 705/7.27 |
| 2009/0136909 A1* | 5/2009 | Asukai | G01S 5/0027 434/236 |
| 2009/0265163 A1* | 10/2009 | Li | G06Q 10/10 704/10 |
| 2010/0109881 A1* | 5/2010 | Eskandarian | A61B 5/6887 340/575 |
| 2010/0152600 A1* | 6/2010 | Droitcour | A61B 5/05 600/534 |
| 2012/0133654 A1* | 5/2012 | Redgrave | G06T 15/005 345/419 |
| 2012/0245481 A1* | 9/2012 | Blanco | A61B 5/048 600/544 |
| 2012/0290950 A1* | 11/2012 | Rapaport | H04L 51/32 715/753 |
| 2013/0027251 A1* | 1/2013 | Lu | G01S 3/34 342/451 |
| 2013/0080348 A1* | 3/2013 | Pantaliano | G06Q 30/02 705/347 |
| 2014/0031703 A1* | 1/2014 | Rayner | A61B 5/02055 600/484 |
| 2014/0201126 A1* | 7/2014 | Zadeh | G06K 9/627 706/52 |
| 2016/0140208 A1* | 5/2016 | Dang | G06F 17/30943 707/737 |

\* cited by examiner

800A

| Time | Notifications | Location | Proximity Signature |
|---|---|---|---|
| 1 | Coffee Pot On | 36, -115.10 | .47 |
| 2 | X | X | .48 |
| 3 | X | 36, -115.14 | .47 |
| 4 | X | 36, -115.13 | X |
| 5 | X | X | .50 |
| 7 | X | X | .51 |
| 7 | X | X | .52 |
| 8 | X | X | .54 |
| 9 | X | 36, -115.14 | .55 |
| 10 | Coffee Pot Off | 36, -115.13 | X |

SAMPLE DATA

| Time | Notifications | Location | Proximity Signature |
|---|---|---|---|
| 1 | Coffee Pot On | 36, -115.10 | .47 |
| 2 | X | X | .48 |
| 3 | X | 36, -115.14 | .47 |
| 4 | X | 36, -115.13 | X |
| 5 | X | X | .50 |
| 7 | X | X | .51 |
| 7 | X | X | .52 |
| 8 | X | X | .54 |
| 9 | X | 36, -115.14 | .55 |
| 10 | Coffee Pot Off | 36, -115.13 | X |
| Vector Output | 2(count) | (36, -115.128) | .4733, .51, .54.5 (centroids) |

PRE-PROCESSING THE DATA

| Time | Notifications (count) | Location (average) | Proximity Signature (centroids) |
|---|---|---|---|
| 1-10 | 2 | (36, -115.128) | .4733, 51, 54.5 |
| 11-20 | 4 | (36, -115.32) | .48, .52, .56 |
| 21-30 | 3 | 36, -115.14 | .47, .515, .54.5 |

SAMPLE PRE-PROCESSED DATA

*FIG. 8C*

METHOD AND APPARATUS FOR SYNCHRONIZING DATA INPUTS GENERATED AT A PLURALITY OF FREQUENCIES BY A PLURALITY OF DATA SOURCES

CROSS-REFERENCE TO RELATED APPLICATIONS

The present application for patent claims the benefit of U.S. Provisional Application No. 62/035,613, entitled "BUILDING A MODEL FROM MULTIPLE DATA SOURCES OF DIFFERING TYPES WITH DIFFERING RECURRENCE PATTERNS," filed Aug. 11, 2014, assigned to the assignee hereof, and expressly incorporated herein by reference in its entirety.

INTRODUCTION

The disclosure is related to synchronizing data inputs generated at a plurality of frequencies by a plurality of data sources of a first device.

User devices often receive numerous bits of data from many different data sources. Such data may include accelerometer data, temperature data, location data (e.g., from a global positioning system (GPS) receiver), notification data (e.g., from call notifications, text message notifications, "smart" device notifications, etc.). This data may be received at varying times and with varying frequencies. For example, a GPS receiver may generate location data every second, while a "smart" device may generate notifications every few minutes or hours.

SUMMARY

The following presents a simplified summary relating to one or more aspects and/or embodiments associated with the mechanisms disclosed herein for synchronizing data inputs generated at a plurality of frequencies by a plurality of data sources of a first device. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

A method for synchronizing data inputs generated at a plurality of frequencies by a plurality of data sources of a device includes receiving a first set of data points from a first data source of the plurality of data sources, the first set of data points comprising data points generated at a first frequency of the plurality of frequencies, receiving a second set of data points from a second data source of the plurality of data sources, the second set of data points comprising data points generated at a second frequency of the plurality of frequencies, selecting a time window that corresponds to a period of time during which at least a subset of the first set of data points and at least a subset of the second set of data points were generated, and generating a vector representing a first reduced form of the subset of the first set of data points and a second reduced form of the subset of the second set of data points received during the time window.

An apparatus for synchronizing data inputs generated at a plurality of frequencies by a plurality of data sources of a first device includes a processor configured to receive a first set of data points from a first data source of the plurality of data sources, the first set of data points comprising data points generated at a first frequency of the plurality of frequencies, receive a second set of data points from a second data source of the plurality of data sources, the second set of data points comprising data points generated at a second frequency of the plurality of frequencies, select a time window that corresponds to a period of time during which at least a subset of the first set of data points and at least a subset of the second set of data points were generated, and generate a vector representing a first reduced form of the subset of the first set of data points and a second reduced form of the subset of the second set of data points received during the time window.

An apparatus for synchronizing data inputs generated at a plurality of frequencies by a plurality of data sources of a first device includes means for receiving a first set of data points from a first data source of the plurality of data sources, the first set of data points comprising data points generated at a first frequency of the plurality of frequencies, means for receiving a second set of data points from a second data source of the plurality of data sources, the second set of data points comprising data points generated at a second frequency of the plurality of frequencies, means for selecting a time window that corresponds to a period of time during which at least a subset of the first set of data points and at least a subset of the second set of data points were generated, and means for generating a vector representing a first reduced form of the subset of the first set of data points and a second reduced form of the subset of the second set of data points received during the time window.

A non-transitory computer-readable medium for synchronizing data inputs generated at a plurality of frequencies by a plurality of data sources of a first device includes at least one instruction for receiving a first set of data points from a first data source of the plurality of data sources, the first set of data points comprising data points generated at a first frequency of the plurality of frequencies, at least one instruction for receiving a second set of data points from a second data source of the plurality of data sources, the second set of data points comprising data points generated at a second frequency of the plurality of frequencies, at least one instruction for selecting a time window that corresponds to a period of time during which at least a subset of the first set of data points and at least a subset of the second set of data points were generated, and at least one instruction for generating a vector representing a first reduced form of the subset of the first set of data points and a second reduced form of the subset of the second set of data points received during the time window.

Other objects and advantages associated with the mechanisms disclosed herein will be apparent to those skilled in the art based on the accompanying drawings and detailed description.

BRIEF DESCRIPTION OF THE DRAWINGS

A more complete appreciation of embodiments of the disclosure and many of the attendant advantages thereof will be readily obtained as the same becomes better understood by reference to the following detailed description when considered in connection with the accompanying drawings which are presented solely for illustration and not limitation of the disclosure, and in which:

FIGS. 8A-C are exemplary tables illustrating various aspects of the disclosure.

DETAILED DESCRIPTION

Figure 1:
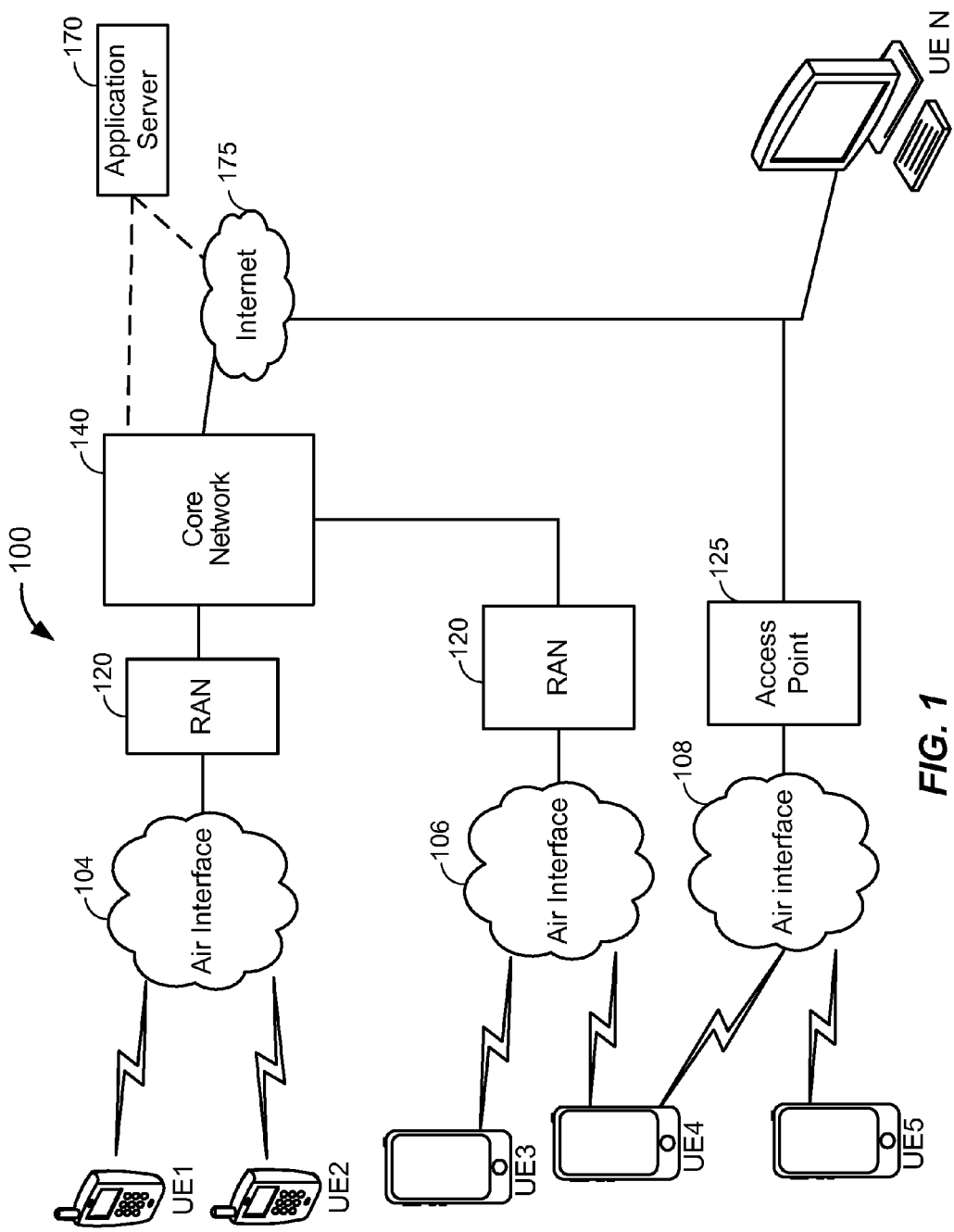
FIG. 1 illustrates a high-level system architecture of a wireless communications system in accordance with an embodiment of the disclosure.

The disclosure relates to synchronizing data inputs generated at a plurality of frequencies by a plurality of data sources of a device. In an aspect, the device receives a first set of data points from a first data source of the plurality of data sources, the first set of data points comprising data points generated at a first frequency of the plurality of frequencies, receives a second set of data points from a second data source of the plurality of data sources, the second set of data points comprising data points generated at a second frequency of the plurality of frequencies, selects a time window that corresponds to a period of time during which at least a subset of the first set of data points and at least a subset of the second set of data points were generated, and generates a vector representing a first reduced form of the subset of the first set of data points and a second reduced form of the subset of the second set of data points received during the time window.

The device may further send a first user model from the first device to a second device, the first user model comprising at least the vector, receive a second user model from the second device, the second user model comprising at least a second vector, the second vector representing a third reduced form of a subset of a third set of data points and a fourth reduced form of a subset of a fourth set of data points received during a second time window, compare at least the vector with at least the second vector, determine whether the time window is within a threshold period of time of the second time window, determine whether the first reduced form of the subset of the first set of data points and/or the second reduced form of the subset of the second set of data points are within a threshold value of the third reduced form of the subset of the third set of data points and/or the fourth reduced form of the subset of the fourth set of data points, and, based on the time window being within the threshold period of time of the second time window and the first reduced form of the subset of the first set of data points and/or the second reduced form of the subset of the second set of data points being within the threshold value of the third reduced form of the subset of the third set of data points and/or the fourth reduced form of the subset of the fourth set of data points, determine that there is a correlation between the first device and the second device.

These and other aspects of the disclosure are described in the following description and related drawings directed to specific embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.).

As used herein the term traffic channel (TCH) can refer to either an uplink/reverse or downlink/forward traffic channel.

FIG. 1 illustrates a high-level system architecture of a wireless communications system 100 in accordance with an embodiment of the disclosure. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a server 170 is shown as connected to the Internet 175, the core network 140, or both. The server 170 can be implemented as a plurality of structurally separate servers, or alternately may correspond to a single server. As will be described below in more detail, the server 170 is configured to support one or more communication services (e.g., Voice-over-Internet Protocol (VoIP) sessions, Push-to-Talk (PTT) sessions, group communication sessions, social networking services, etc.) for UEs that can connect to the server 170 via the core network 140 and/or the Internet 175, and/or to provide content (e.g., web page downloads) to the UEs.

Figure 2:
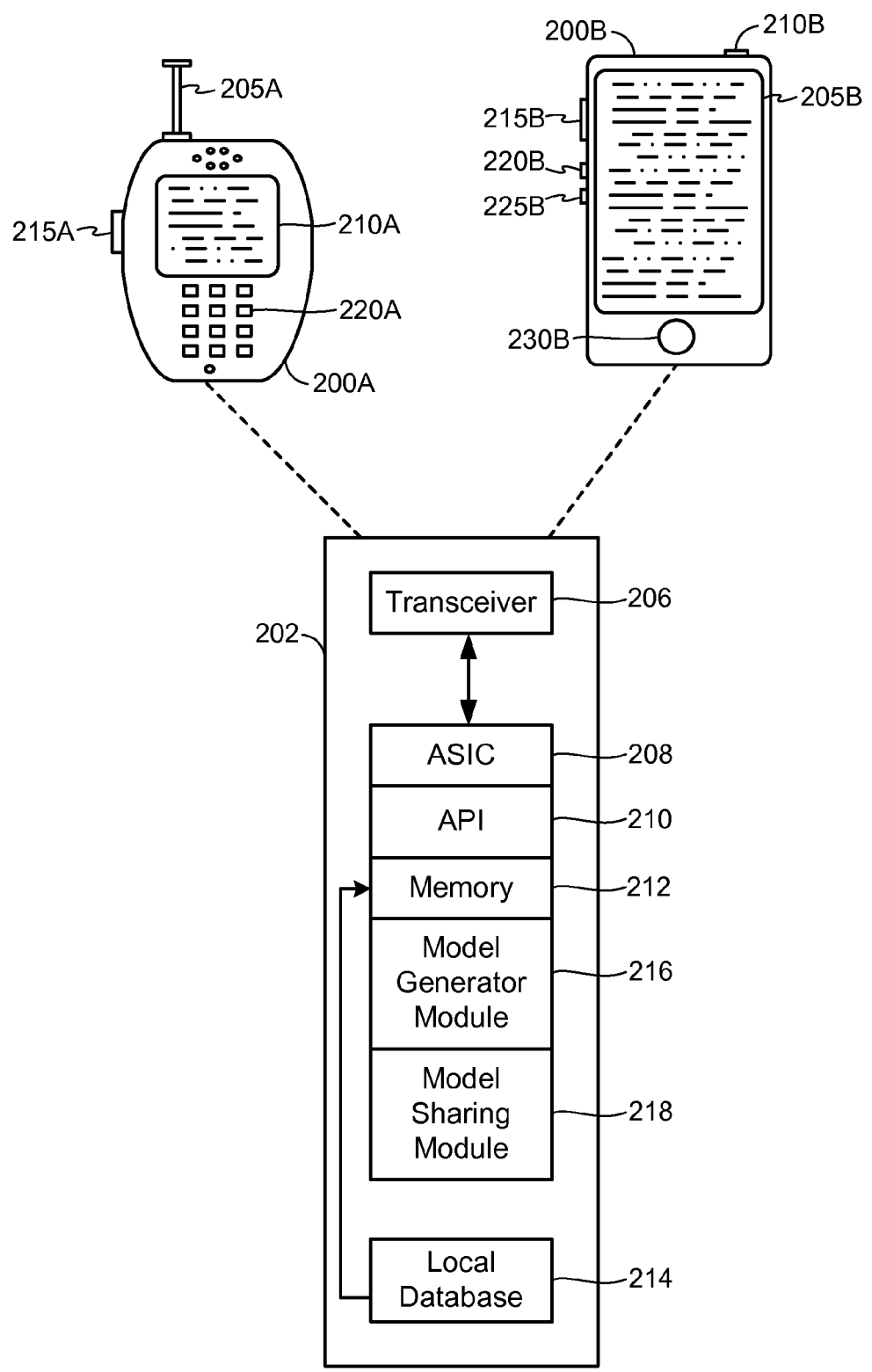
FIG. 2 illustrates examples of user equipments (UEs) in accordance with embodiments of the disclosure.

FIG. 2 illustrates examples of UEs (i.e., client devices) in accordance with embodiments of the disclosure. Referring to FIG. 2, UE 200A is illustrated as a calling telephone and UE 200B is illustrated as a touchscreen device (e.g., a smart phone, a tablet computer, etc.). As shown in FIG. 2, an external casing of UE 200A is configured with an antenna 205A, display 210A, at least one button 215A (e.g., a PTT button, a power button, a volume control button, etc.) and a keypad 220A among other components, as is known in the art. Also, an external casing of UE 200B is configured with a touchscreen display 205B, peripheral buttons 210B, 215B, 220B and 225B (e.g., a power control button, a volume or vibrate control button, an airplane mode toggle button, etc.), at least one front-panel button 230B (e.g., a Home button, etc.), among other components, as is known in the art. While not shown explicitly as part of UE 200B, the UE 200B can include one or more external antennas and/or one or more integrated antennas that are built into the external casing of UE 200B, including but not limited to WiFi antennas, cellular antennas, satellite position system (SPS) antennas (e.g., global positioning system (GPS) antennas), and so on.

While internal components of UEs such as the UEs 200A and 200B can be embodied with different hardware configurations, a basic high-level UE configuration for internal hardware components is shown as platform 202 in FIG. 2. The platform 202 can receive and execute software applications, data and/or commands transmitted from the RAN 120 that may ultimately come from the core network 140, the Internet 175 and/or other remote servers and networks (e.g., server 170, web URLs, etc.). The platform 202 can also independently execute locally stored applications without RAN interaction. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can store applications not actively used in memory 212, as well as other data. The local database 214 is typically a flash memory cell, but can be any secondary storage device as known in the art, such as magnetic media, EEPROM, optical media, tape, soft or hard disk, or the like. The platform 202 may also include a model generator module 216 and a model sharing module 218, which may be stored in memory 212 and executable by ASIC 208, or may be a hardware components coupled to or integrated into ASIC 208.

Accordingly, an embodiment of the disclosure can include a UE (e.g., UE 200A, 200B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210, local database 214, model generator module 216 and/or model sharing module 218 may all be used cooperatively to load, store and execute the various functions disclosed herein and thus the logic to perform these functions may be distributed over various elements. Alternatively, the functionality could be incorporated into one discrete component, such as the model generator module 216 and/or model sharing module 218. Therefore, the features of the UEs 200A and 200B in FIG. 2 are to be considered merely illustrative and the disclosure is not limited to the illustrated features or arrangement.

For example, where the UE 200A/200B is configured to synchronize data inputs generated at a plurality of frequencies by a plurality of data sources of the UE 200A/200B as described further herein, the model generator module 216 (in conjunction with the ASIC 208 where the model generator module 216 is an executable module stored in memory 212) may be configured to receive a first set of data points from a first data source of the plurality of data sources generated at a first frequency of the plurality of frequencies, receive a second set of data points from a second data source of the plurality of data sources generated at a second frequency of the plurality of frequencies, select a time window that corresponds to a period of time during which at least a subset of the first set of data points and at least a subset of the second set of data points were generated, and generate a vector representing a first reduced form of the subset of the first set of data points and a second reduced form of the subset of the second set of data points received during the time window. In this way, the UE 200A/200B, via the model generator module 216, may synchronize data inputs generated at a plurality of frequencies by a plurality of data sources of the UE 200A/200B.

In an embodiment, the first reduced form of the subset of the first set of data points may be a count of the subset of the first set of data points, an average of the subset of the first set of data points, or centroids corresponding to clusters of the subset of the first set of data points, as described further herein. Similarly, the second reduced form of the subset of the second set of data points may be a count of the subset of the second set of data points, an average of the subset of the second set of data points, or centroids corresponding to clusters of the subset of the second set of data points.

The plurality of data sources may be, for example, sensors resident on UE 200A or 200B (not shown). The model generator module 216 in conjunction with the ASIC 208 may receive the first and second sets of data points from memory 212, local database 214, API 210, or may receive them directly from the first and second data sources.

In another aspect, the transceiver 206 may also be configured to receive the first set of data points from the first data source and receive the second set of data points from the second data source. The model generator module 216 in conjunction with the ASIC 208 may then receive the first and second data points from the transceiver 206.

In yet another aspect, as described further herein, the model sharing module 218 (in conjunction with the ASIC 208 where the model sharing module 218 is an executable module stored in memory 212) may be configured to send a first user model from the UE 200A/200B to a second device, the first user model comprising at least the vector generated by the model generator module 216, and to receive a second user model from the second device, the second user model comprising at least a second vector, the second vector representing a third reduced form of a subset of a third set of data points and a fourth reduced form of a subset of a fourth set of data points received during a second time window. The model sharing module 218 (in conjunction with the ASIC 208 where the model sharing module 218 is an executable module stored in memory 212) may be further configured to compare at least the vector with at least the second vector, determine whether the time window is within a threshold period of time of the second time window, determine whether the first reduced form of the subset of the first set of data points and/or the second reduced form of the subset of the second set of data points are within a threshold value of the third reduced form of the subset of the third set of data points and/or the fourth reduced form of the subset of the fourth set of data points, and, based on the time window being within the threshold period of time of the second time window and the first reduced form of the subset of the first set of data points and/or the second reduced form of the subset of the second set of data points being within the threshold value of the third reduced form of the subset of the third set of data points and/or the fourth reduced form of the subset of the fourth set of data points, determine that there is a correlation between the first device and the second device.

The wireless communication between the UEs 200A and/or 200B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the disclosure and are merely to aid in the description of aspects of embodiments of the disclosure.

Figure 3:
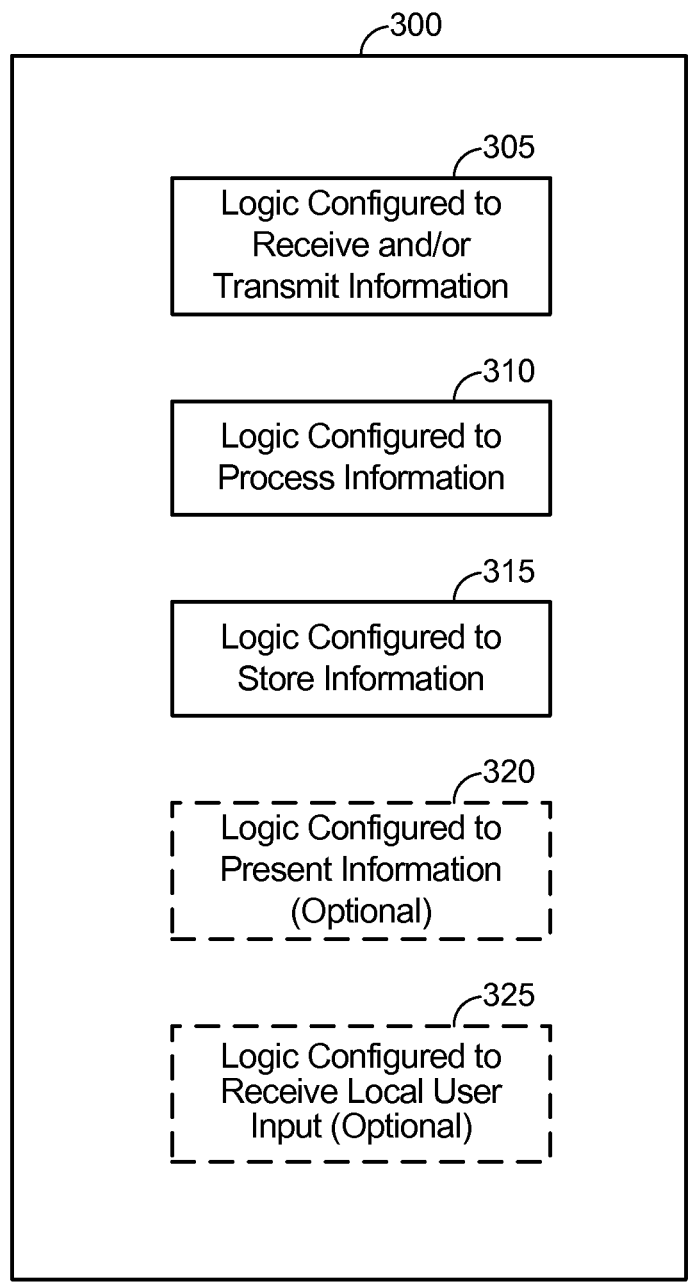
FIG. 3 illustrates a communication device that includes logic configured to perform functionality in accordance with an embodiment of the disclosure.

FIG. 3 illustrates a communication device 300 that includes logic configured to perform functionality. The communication device 300 can correspond to any of the above-noted communication devices, including but not limited to UEs 200A or 200B, any component of the RAN 120, any component of the core network 140, any components coupled with the core network 140 and/or the Internet 175 (e.g., the server 170), and so on. Thus, communication device 300 can correspond to any electronic device that is configured to communicate with (or facilitate communication with) one or more other entities over the wireless communications system 100 of FIG. 1.

Referring to FIG. 3, the communication device 300 includes logic configured to receive and/or transmit information 305. In an example, if the communication device 300 corresponds to a wireless communications device (e.g., UE 200A or 200B, AP 125, a BS, Node B or eNodeB in the RAN 120, etc.), the logic configured to receive and/or transmit information 305 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., server 170, etc.), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s).

However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. The processor included in the logic configured to process information 310 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM memory, flash memory, ROM memory, EPROM memory, EEPROM memory, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

In an embodiment, the logic configured to process information 310 may be coupled to a hardware or firmware model generator module, such as model generator module 216 in FIG. 2, and a hardware or firmware model sharing module, such as model sharing module 218 in FIG. 2. Alternatively, the logic configured to store information 315 may store a model generator module, such as model generator module 216 in FIG. 2, and a model sharing module, such as model sharing module 218 in FIG. 2, executable by the logic configured to process information 310. Where the communication device 300 is configured to synchronize data inputs generated at a plurality of frequencies by a plurality of data sources of a first device, the model generator module may cause the logic configured to receive and/or transmit information and/or the logic configured to process information 310 to receive a first set of data points from a first data source of the plurality of data sources, the first set of data points comprising data points generated at a first frequency of the plurality of frequencies, receive a second set of data points from a second data source of the plurality of data sources, the second set of data points comprising data points generated at a second frequency of the plurality of frequencies, select a time window that corresponds to a period of time during which at least a subset of the first set of data points and at least a subset of the second set of data points were generated, and generate a vector representing a first reduced form of the subset of the first set of data points and a second reduced form of the subset of the second set of data points received during the time window, as described herein.

The model sharing module may cause the logic configured to receive and/or transmit information and/or the logic configured to process information 310 to send a first user model from the first device to a second device, the first user model comprising at least the vector, receive a second user model from the second device, the second user model comprising at least a second vector, the second vector representing a third reduced form of a subset of a third set of data points and a fourth reduced form of a subset of a fourth set of data points received during a second time window, compare at least the vector with at least the second vector, determine whether the time window is within a threshold period of time of the second time window, determine whether the first reduced form of the subset of the first set of data points and/or the second reduced form of the subset of the second set of data points are within a threshold value of the third reduced form of the subset of the third set of data points and/or the fourth reduced form of the subset of the fourth set of data points, and based on the time window being within the threshold period of time of the second time window and the first reduced form of the subset of the first set of data points and/or the second reduced form of the subset of the second set of data points being within the threshold value of the third reduced form of the subset of the third set of data points and/or the fourth reduced form of the subset of the fourth set of data points, determine that there is a correlation between the first device and the second device, as described herein.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to UE 200A or UE 200B as shown in FIG. 2, the logic configured to present information 320 can include the display 210A of UE 200A or the touchscreen display 205B of UE 200B. In a further example, the logic configured to present information 320 can be omitted for certain communication devices, such as network communication devices that do not have a local user (e.g., network switches or routers, remote servers such as the server 170, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to UE 200A or UE 200B as shown in FIG. 2, the logic configured to receive local user input 325 can include the keypad 220A, any of the buttons 215A or 210B through 225B, the touchscreen display 205B, etc. In a further example, the logic configured to receive local user input 325 can be omitted for certain communication devices, such as network communication devices that do not have a local user (e.g., network switches or routers, remote servers such as the server 170, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 4:
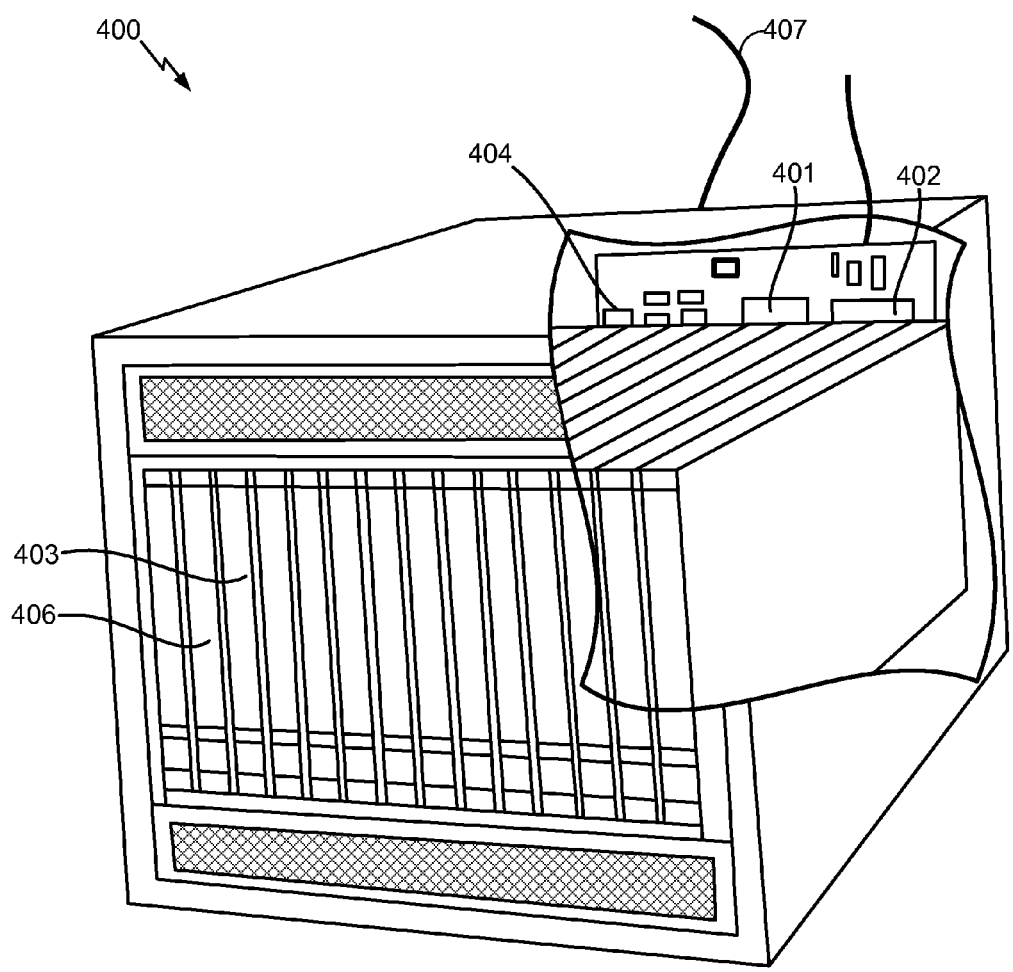
FIG. 4 illustrates a server in accordance with an embodiment of the disclosure.

The various embodiments may be implemented on any of a variety of commercially available server devices, such as server 400 illustrated in FIG. 4. In an example, the server 400 may correspond to one example configuration of the server 170 described above. In FIG. 4, the server 400 includes a processor 400 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access ports 304 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to a UE implementation as in 205A or 205B as in FIG. 2.

Although not illustrated in FIG. 4, the server 400 may also include a model generator module similar to model generator module 216 in FIG. 2. Where the server 400 is configured to synchronize data inputs generated at a plurality of frequencies by a plurality of data sources of one or more devices, such as UE 200A/200B, such a model generator module (in conjunction with the processor 401 where the model generator module is an executable module) may be configured to receive a first set of data points from a first data source of the plurality of data sources generated at a first frequency of the plurality of frequencies, receive a second set of data points from a second data source of the plurality of data sources generated at a second frequency of the plurality of frequencies, select a time window that corresponds to a period of time during which at least a subset of the first set of data points and at least a subset of the second set of data points were generated, and generate a vector representing a first reduced form of the subset of the first set of data points and a second reduced form of the subset of the second set of data points received during the time window. The plurality of data sources may be, for example, sensors resident on one or more user devices, such as UE 200A and/or 200B, and the first and second sets of data points may be received from the one or more user devices via network access ports 404 and stored in memory 403. Thus, the model generator module (in conjunction with the processor 401)

may receive the first and second sets of data points from memory 403 or directly from network access ports 404.

Although not illustrated in FIG. 4, the server 400 may also include a model sharing module, such as model sharing module 218 in FIG. 2. Such a model sharing module (in conjunction with the processor 401 where the model sharing module is an executable module) may be configured to receive a first user model from a first user device, the first user model comprising at least the vector generated by a model generator module (of the server 400 or the first user device), and to receive a second user model from the second user device, the second user model comprising at least a second vector, the second vector representing a third reduced form of a subset of a third set of data points and a fourth reduced form of a subset of a fourth set of data points received during a second time window. The model sharing module (in conjunction with the processor 401 where the model sharing module is an executable module) may be further configured to compare at least the vector with at least the second vector, determine whether the time window is within a threshold period of time of the second time window, determine whether the first reduced form of the subset of the first set of data points and/or the second reduced form of the subset of the second set of data points are within a threshold value of the third reduced form of the subset of the third set of data points and/or the fourth reduced form of the subset of the fourth set of data points, and, based on the time window being within the threshold period of time of the second time window and the first reduced form of the subset of the first set of data points and/or the second reduced form of the subset of the second set of data points being within the threshold value of the third reduced form of the subset of the third set of data points and/or the fourth reduced form of the subset of the fourth set of data points, determine that there is a correlation between the first device and the second device.

Figure 5:
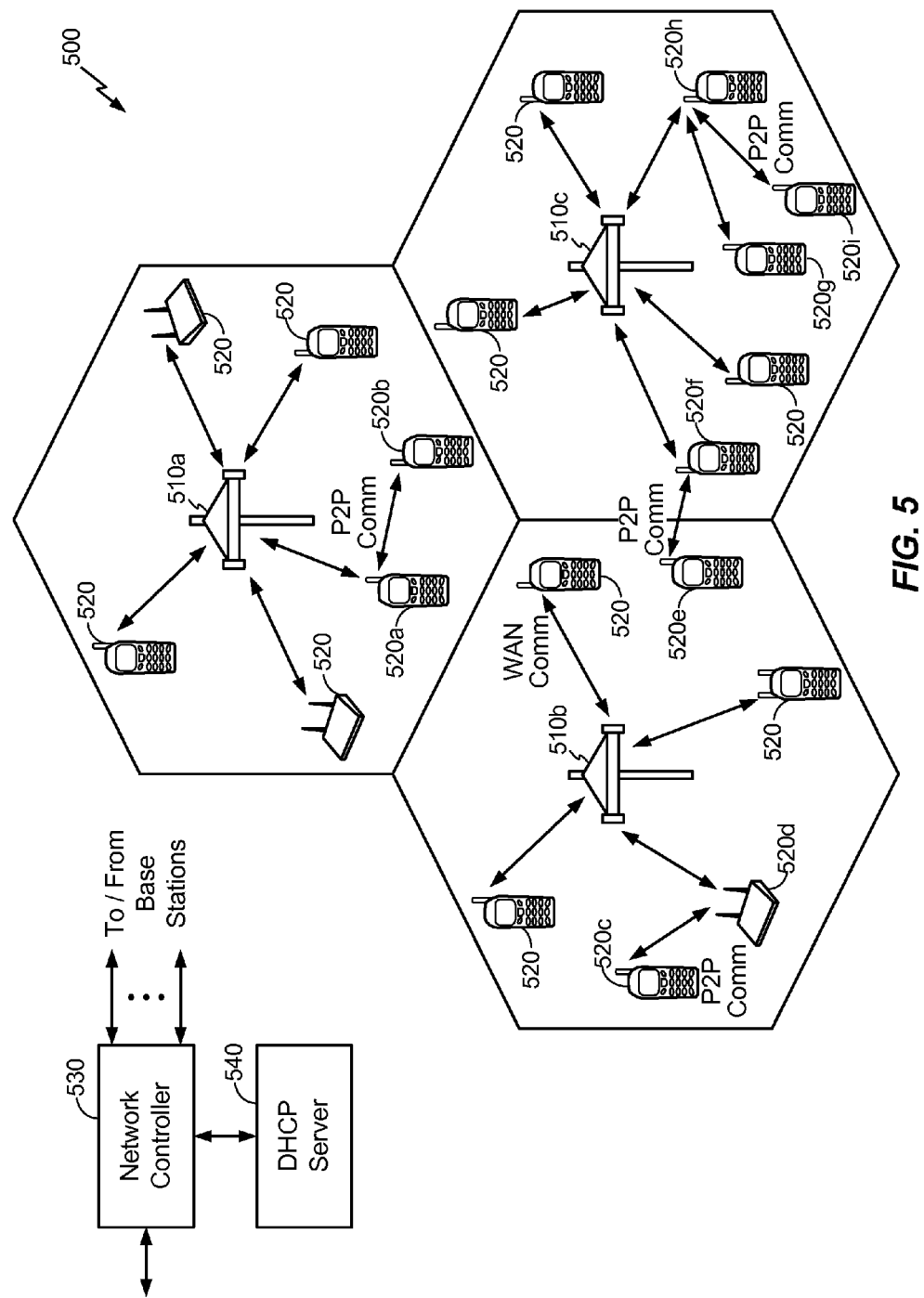
FIG. 5 illustrates a wireless communication network that may support discoverable peer-to-peer (P2P) services, in accordance with one aspect of the disclosure.

In general, user equipment (UE) such as telephones, tablet computers, laptop and desktop computers, certain vehicles, etc., can be configured to connect with each other either locally (e.g., Bluetooth, local Wi-Fi, etc.) or remotely (e.g., via cellular networks, through the Internet, etc.). Furthermore, certain UEs may also support proximity-based peer-to-peer (P2P) communication using certain wireless networking technologies (e.g., Wi-Fi, Bluetooth, Wi-Fi Direct, etc.) that enable devices to make a one-to-one connection or simultaneously connect to a group that includes several devices in order to directly communicate with one another. To that end, FIG. 5 illustrates an exemplary wireless communication network or WAN 500 that may support discoverable P2P services. For example, in one embodiment, the wireless communication network 500 may comprise an LTE network or another suitable WAN that includes various base stations 510 and other network entities. For simplicity, only three base stations 510a, 510b and 510c, one network controller 530, and one Dynamic Host Configuration Protocol (DHCP) server 540 are shown in FIG. 5. A base station 510 may be an entity that communicates with devices 520 and may also be referred to as a Node B, an evolved Node B (eNB), an access point, etc. Each base station 510 may provide communication coverage for a particular geographic area and may support communication for the devices 520 located within the coverage area. To improve network capacity, the overall coverage area of a base station 510 may be partitioned into multiple (e.g., three) smaller areas, wherein each smaller area may be served by a respective base station 510. In 3GPP, the term "cell" can refer to a coverage area of a base station 510 and/or a base station subsystem 510 serving this coverage area, depending on the context in which the term is used. In 3GPP2, the term "sector" or "cell-sector" can refer to a coverage area of a base station 510 and/or a base station subsystem 510 serving this coverage area. For clarity, the 3GPP concept of "cell" may be used in the description herein.

A base station 510 may provide communication coverage for a macro cell, a pico cell, a femto cell, and/or other cell types. A macro cell may cover a relatively large geographic area (e.g., several kilometers in radius) and may allow unrestricted access by devices 520 with service subscription. A pico cell may cover a relatively small geographic area and may allow unrestricted access by devices 520 with service subscription. A femto cell may cover a relatively small geographic area (e.g., a home) and may allow restricted access by devices 520 having association with the femto cell (e.g., devices 520 in a Closed Subscriber Group (CSG)). In the example shown in FIG. 5, wireless network 500 includes macro base stations 510a, 510b and 510c for macro cells. Wireless network 500 may also include pico base stations 510 for pico cells and/or home base stations 510 for femto cells (not shown in FIG. 5).

Network controller 530 may couple to a set of base stations 510 and may provide coordination and control for these base stations 510. Network controller 530 may be a single network entity or a collection of network entities that can communicate with the base stations via a backhaul. The base stations may also communicate with one another, e.g., directly or indirectly via wireless or wireline backhaul. DHCP server 540 may support P2P communication, as described below. DHCP server 540 may be part of wireless network 500, external to wireless network 500, run via Internet Connection Sharing (ICS), or any suitable combination thereof. DHCP server 540 may be a separate entity (e.g., as shown in FIG. 5) or may be part of a base station 510, network controller 530, or some other entity. In any case, DHCP server 540 may be reachable by devices 520 desiring to communicate peer-to-peer.

Devices 520 may be dispersed throughout wireless network 500, and each device 520 may be stationary or mobile. A device 520 may also be referred to as a node, user equipment (UE), a station, a mobile station, a terminal, an access terminal, a subscriber unit, etc. A device 520 may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc. A device 520 may communicate with base stations 510 in the wireless network 500 and may further communicate peer-to-peer with other devices 520. For example, as shown in FIG. 5, devices 520a and 520b may communicate peer-to-peer, devices 520c and 520d may communicate peer-to-peer, devices 520e and 520f may communicate peer-to-peer, and devices 520g, 520h, and 520i may communicate peer-to-peer, while remaining devices 520 may communicate with base stations 510. As further shown in FIG. 5, devices 520a, 520d, 520f, and 520h may also communicate with base stations 500, e.g., when not engaged in P2P communication or possibly concurrent with P2P communication.

In the description herein, WAN communication may refer to communication between a device 520 and a base station 510 in wireless network 500, e.g., for a call with a remote entity such as another device 520. A WAN device is a device 520 that is interested or engaged in WAN communication. P2P communication refers to direct communication between two or more devices 520, without going through any base station 510. A P2P device is a device 520 that is interested or engaged in P2P communication, e.g., a device 520 that has traffic data for another device 520 within proximity of the P2P device. Two devices may be considered to be within proximity of one another, for example, if each device 520 can detect the other device 520. In general, a device 520 may communicate with another device 520 either directly for P2P communication or via at least one base station 510 for WAN communication.

In one embodiment, direct communication between P2P devices 520 may be organized into P2P groups. More particularly, a P2P group generally refers to a group of two or more devices 520 interested or engaged in P2P communication and a P2P link refers to a communication link for a P2P group. Furthermore, in one embodiment, a P2P group may include one device 520 designated a P2P group owner (or a P2P server) and one or more devices 520 designated P2P clients that are served by the P2P group owner. The P2P group owner may perform certain management functions such as exchanging signaling with a WAN, coordinating data transmission between the P2P group owner and P2P clients, etc. For example, as shown in FIG. 5, a first P2P group includes devices 520a and 520b under the coverage of base station 510a, a second P2P group includes devices 520c and 520d under the coverage of base station 510b, a third P2P group includes devices 520e and 520f under the coverage of different base stations 510b and 510c, and a fourth P2P group includes devices 520g, 520h and 520i under the coverage of base station 510c. Devices 520a, 520d, 520f, and 520h may be P2P group owners for their respective P2P groups and devices 520b, 520c, 520e, 520g, and 520i may be P2P clients in their respective P2P groups. The other devices 520 in FIG. 5 may be engaged in WAN communication.

In one embodiment, P2P communication may occur only within a P2P group and may further occur only between the P2P group owner and the P2P clients associated therewith. For example, if two P2P clients within the same P2P group (e.g., devices 520g and 520i) desire to exchange information, one of the P2P clients may send the information to the P2P group owner (e.g., device 520h) and the P2P group owner may then relay transmissions to the other P2P client. In one embodiment, a particular device 520 may belong to multiple P2P groups and may behave as either a P2P group owner or a P2P client in each P2P group. Furthermore, in one embodiment, a particular P2P client may belong to only one P2P group or belong to multiple P2P group and communicate with P2P devices 520 in any of the multiple P2P groups at any particular moment. In general, communication may be facilitated via transmissions on the downlink and uplink. For WAN communication, the downlink (or forward link) refers to the communication link from base stations 510 to devices 520, and the uplink (or reverse link) refers to the communication link from devices 520 to base stations 510. For P2P communication, the P2P downlink refers to the communication link from P2P group owners to P2P clients and the P2P uplink refers to the communication link from P2P clients to P2P group owners. In certain embodiments, rather than using WAN technologies to communicate P2P, two or more devices may form smaller P2P groups and communicate P2P on a wireless local area network (WLAN) using technologies such as Wi-Fi, Bluetooth, or Wi-Fi Direct. For example, P2P communication using Wi-Fi, Bluetooth, Wi-Fi Direct, or other WLAN technologies may enable P2P communication between two or more mobile phones, game consoles, laptop computers, or other suitable communication entities.

Figure 6:
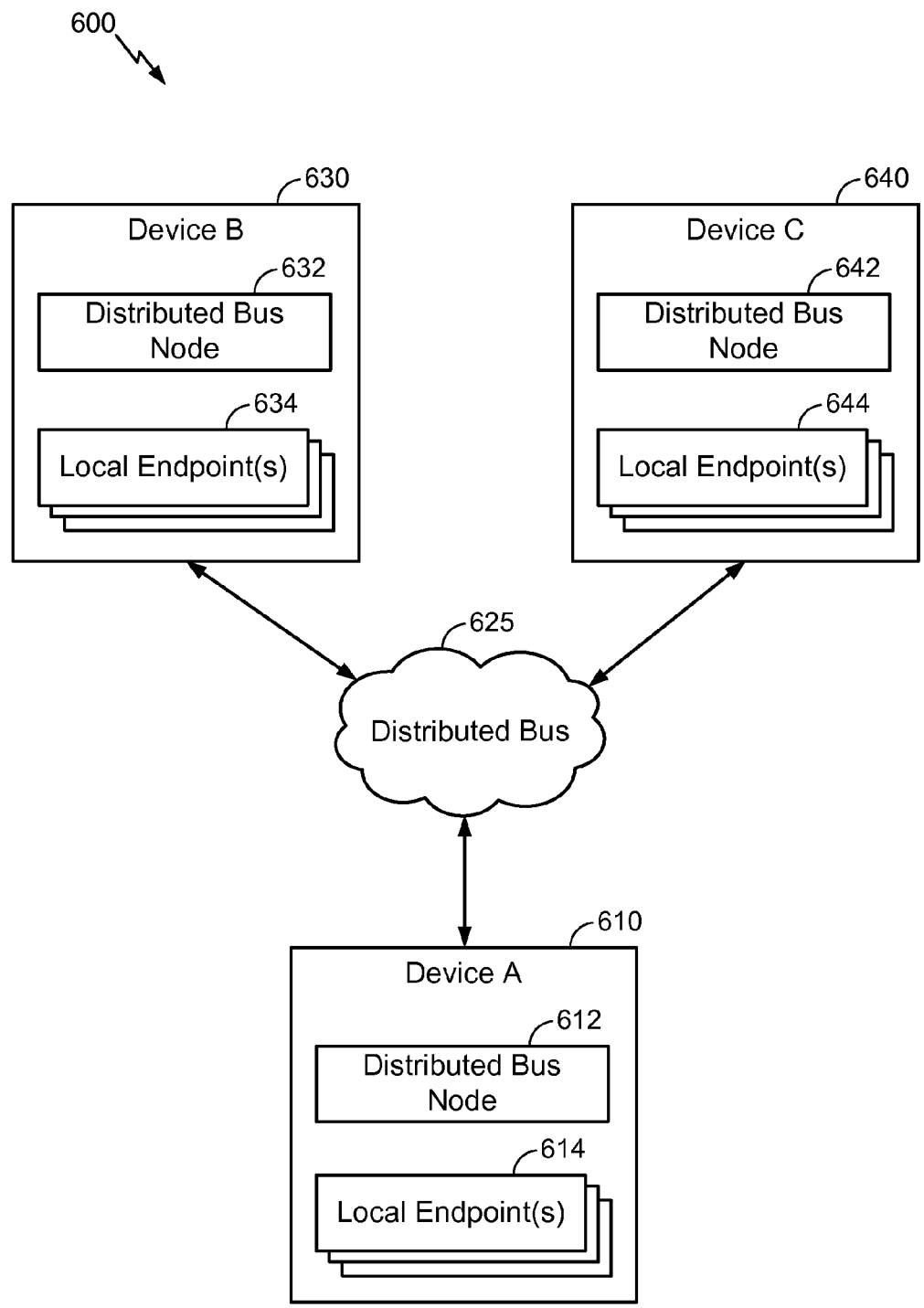
FIG. 6 illustrates an exemplary environment in which discoverable P2P services may be used to establish a proximity-based distributed bus over which various devices may communicate, in accordance with one aspect of the disclosure.

According to one aspect of the disclosure, FIG. 6 illustrates an exemplary environment 600 in which discoverable P2P services may be used to establish a proximity-based distributed bus over which various devices 610, 630, 640 may communicate. For example, in one embodiment, communications between applications and the like, on a single platform may be facilitated using an interprocess communication protocol (IPC) framework over the distributed bus 625, which may comprise a software bus used to enable application-to-application communications in a networked computing environment where applications register with the distributed bus 625 to offer services to other applications and other applications query the distributed bus 625 for information about registered applications. Such a protocol may provide asynchronous notifications and remote procedure calls (RPCs) in which signal messages (e.g., notifications) may be point-to-point or broadcast, method call messages (e.g., RPCs) may be synchronous or asynchronous, and the distributed bus 625 (e.g., a "daemon" bus process) may handle message routing between the various devices 610, 630, 640.

In one embodiment, the distributed bus 625 may be supported by a variety of transport protocols (e.g., Bluetooth, TCP/IP, Wi-Fi, CDMA, GPRS, UMTS, etc.). For example, according to one aspect, a first device 610 may include a distributed bus node 612 and one or more local endpoints 614, wherein the distributed bus node 612 may facilitate communications between local endpoints 614 associated with the first device 610 and local endpoints 634 and 644 associated with a second device 630 and a third device 640 through the distributed bus 625 (e.g., via distributed bus nodes 632 and 642 on the second device 630 and the third device 640). As will be described in further detail below with reference to FIG. 7, the distributed bus 625 may support symmetric multi-device network topologies and may provide a robust operation in the presence of device drops-outs. As such, the virtual distributed bus 625, which may generally be independent from any underlying transport protocol (e.g., Bluetooth, TCP/IP, Wi-Fi, etc.) may allow various security options, from unsecured (e.g., open) to secured (e.g., authenticated and encrypted), wherein the security options can be used while facilitating spontaneous connections with among the first device 610, the second device 630, and the third device 640 without intervention when the various devices 610, 630, 640 come into range or proximity to each other.

Figure 7:
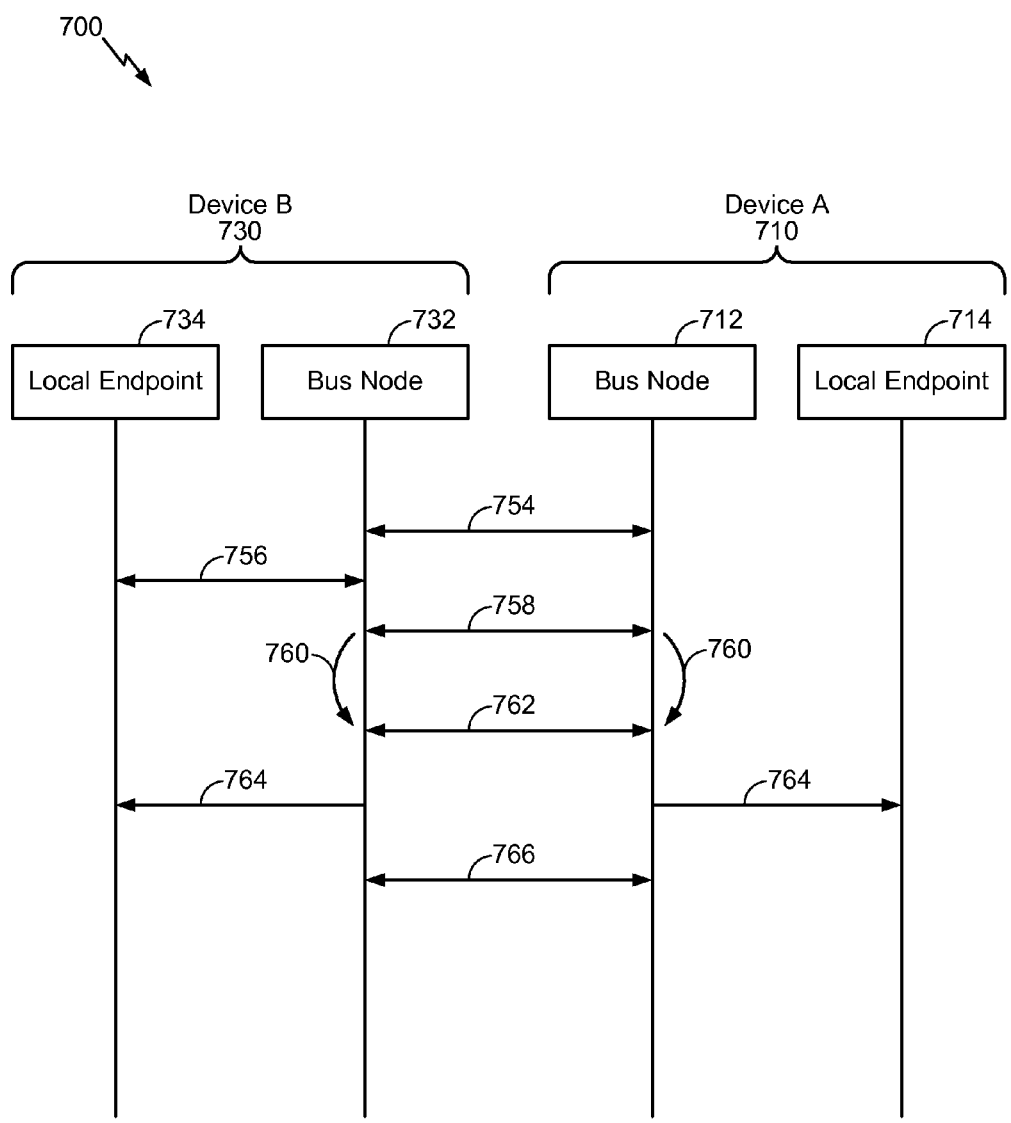
FIG. 7 illustrates an exemplary message sequence in which discoverable P2P services may be used to establish a proximity-based distributed bus over which various devices may communicate, in accordance with one aspect of the disclosure.

According to one aspect of the disclosure, FIG. 7 illustrates an exemplary message sequence 700 in which discoverable P2P services may be used to establish a proximity-based distributed bus over which a first device ("Device A") 710 and a second device ("Device B") 730 may communicate. Generally, Device A 710 may request to communicate with Device B 730, wherein Device A 710 may a include local endpoint 714 (e.g., a local application, service, etc.), which may make a request to communicate in addition to a bus node 712 that may assist in facilitating such communications. Further, Device B 730 may include a local endpoint 734 with which the local endpoint 714 may be attempting to communicate in addition to a bus node 732 that may assist in facilitating communications between the local endpoint 714 on the Device A 710 and the local endpoint 734 on Device B 730.

In one embodiment, the bus nodes 712 and 732 may perform a suitable discovery mechanism at message sequence step 754. For example, mechanisms for discovering connections supported by Bluetooth, TCP/IP, UNIX, or the like may be used. At message sequence step 756, the local endpoint 714 on Device A 710 may request to connect to an entity, service, endpoint etc., available through bus node 712. In one embodiment, the request may include a request-and-response process between local endpoint 714 and bus node 712. At message sequence step 758, a distributed message bus may be formed to connect bus node 712 to bus node 732 and thereby establish a P2P connection between Device A 710 and Device B 730. In one embodiment, communications to form the distributed bus between the bus nodes 712 and 732 may be facilitated using a suitable proximity-based P2P protocol (e.g., the AllJoyn™ software framework designed to enable interoperability among connected products and software applications from different manufacturers to dynamically create proximal networks and facilitate proximal P2P communication). Alternatively, in one embodiment, a server (not shown) may facilitate the connection between the bus nodes 712 and 732. Furthermore, in one embodiment, a suitable authentication mechanism may be used prior to forming the connection between bus nodes 712 and 732 (e.g., SASL authentication in which a client may send an authentication command to initiate an authentication conversation). Still further, during message sequence step 758, bus nodes 712 and 732 may exchange information about other available endpoints (e.g., local endpoints 644 on Device C 640 in FIG. 6). In such embodiments, each local endpoint that a bus node maintains may be advertised to other bus nodes, wherein the advertisement may include unique endpoint names, transport types, connection parameters, or other suitable information.

In one embodiment, at message sequence step 760, bus node 712 and bus node 732 may use obtained information associated with the local endpoints 734 and 714, respectively, to create virtual endpoints that may represent the real obtained endpoints available through various bus nodes. In one embodiment, message routing on the bus node 712 may use real and virtual endpoints to deliver messages. Further, there may one local virtual endpoint for every endpoint that exists on remote devices (e.g., Device A 710). Still further, such virtual endpoints may multiplex and/or de-multiplex messages sent over the distributed bus (e.g., a connection between bus node 712 and bus node 732). In one aspect, virtual endpoints may receive messages from the local bus node 712 or 732, just like real endpoints, and may forward messages over the distributed bus. As such, the virtual endpoints may forward messages to the local bus nodes 712 and 732 from the endpoint multiplexed distributed bus connection. Furthermore, in one embodiment, virtual endpoints that correspond to virtual endpoints on a remote device may be reconnected at any time to accommodate desired topologies of specific transport types. In such an aspect, UNIX based virtual endpoints may be considered local and as such may not be considered candidates for reconnection. Further, TCP-based virtual endpoints may be optimized for one hop routing (e.g., each bus node 712 and 732 may be directly connected to each other). Still further, Bluetooth-based virtual endpoints may be optimized for a single pico-net (e.g., one master and n slaves) in which the Bluetooth-based master may be the same bus node as a local master node.

At message sequence step 762, the bus node 712 and the bus node 732 may exchange bus state information to merge bus instances and enable communication over the distributed bus. For example, in one embodiment, the bus state information may include a well-known to unique endpoint name mapping, matching rules, routing group, or other suitable information. In one embodiment, the state information may be communicated between the bus node 712 and the bus node 732 instances using an interface with local endpoints 714 and 734 communicating with using a distributed bus based local name. In another aspect, bus node 712 and bus node 732 may each may maintain a local bus controller responsible for providing feedback to the distributed bus, wherein the bus controller may translate global methods, arguments, signals, and other information into the standards associated with the distributed bus. At message sequence step 764, the bus node 712 and the bus node 732 may communicate (e.g., broadcast) signals to inform the respective local endpoints 714 and 734 about any changes introduced during bus node connections, such as described above. In one embodiment, new and/or removed global and/or translated names may be indicated with name owner changed signals. Furthermore, global names that may be lost locally (e.g., due to name collisions) may be indicated with name lost signals. Still further, global names that are transferred due to name collisions may be indicated with name owner changed signals and unique names that disappear if and/or when the bus node 712 and the bus node 732 become disconnected may be indicated with name owner changed signals.

As used above, well-known names may be used to uniquely describe local endpoints 714 and 734. In one embodiment, when communications occur between Device A 710 and Device B 730, different well-known name types may be used. For example, a device local name may exist only on the bus node 712 associated with Device A 710 to which the bus node 712 directly attaches. In another example, a global name may exist on all known bus nodes 712 and 732, where only one owner of the name may exist on all bus segments. In other words, when the bus node 712 and bus node 732 are joined and any collisions occur, one of the owners may lose the global name. In still another example, a translated name may be used when a client is connected to other bus nodes associated with a virtual bus. In such an aspect, the translated name may include an appended end (e.g., a local endpoint 714 with well-known name "org.foo" connected to the distributed bus with Globally Unique Identifier "1234" may be seen as "G1234.org.foo").

At message sequence step 766, the bus node 712 and the bus node 732 may communicate (e.g., broadcast) signals to inform other bus nodes of changes to endpoint bus topologies. Thereafter, traffic from local endpoint 714 may move through virtual endpoints to reach intended local endpoint 734 on Device B 730. Further, in operation, communications between local endpoint 714 and local endpoint 734 may use routing groups. In one aspect, routing groups may enable endpoints to receive signals, method calls, or other suitable information from a subset of endpoints. As such, a routing name may be determined by an application connected to a bus node 712 or 732. For example, a P2P application may use a unique, well-known routing group name built into the application. Further, bus nodes 712 and 732 may support registering and/or de-registering of local endpoints 714 and 734 with routing groups. In one embodiment, routing groups may have no persistence beyond a current bus instance. In another aspect, applications may register for their preferred routing groups each time they connect to the distributed bus. Still further, groups may be open (e.g., any endpoint can join) or closed (e.g., only the creator of the group can modify the group). Yet further, a bus node 712 or 732 may send signals to notify other remote bus nodes or additions, removals, or other changes to routing group endpoints. In such embodiments, the bus node 712 or 732 may send a routing group change signal to other group members whenever a member is added and/or removed from the group. Further, the bus node 712 or 732 may send a routing group change signal to endpoints that disconnect from the distributed bus without first removing themselves from the routing group.

When processing data inputs from multiple sources, e.g., different sensors of a given device, it is beneficial to be able to process the data as a single unit, rather than as multiple inputs. However, this presents a challenge when data inputs are processed based on the time they are created, and different data sources are generating data at different rates. For example, for data sources A, B, and C and times 1, 2, and 3, data source A may log generated data at times 1, 2, and 3, data source B may log generated data at time 2, and data source C may log generated data at times 1 and 3.

Accordingly, the present disclosure proposes a mechanism (embodied in a model generator module, such as model generator module 216) whereby data from various data sources is folded together to generate a model that encapsulates all data sources. To accomplish this, the mechanism first selects a time window. The time window may be variable based on environmental conditions, such as the time of day, or based on data quantities, such as a minimum count of a first data type or a maximum count of a second data type.

Next, the proposed mechanism pre-analyzes the data. This can be accomplished by clustering large amounts of data to reduce the dimensionality of the data. For example, if a given data type has 100 inputs in the selected time window, the mechanism can cluster generated data of the given data type to reduce dimensionality. For data sources where the count of the data is more significant, the mechanism can use the count.

Next, the proposed mechanism can average all the data for the time window. Lastly, the mechanism can output the feature vector for the defined time buckets.

These and other aspects of the present disclosure will be described in further detail with reference to the following figures.

FIG. 8A is an exemplary table 800A of sample data generated by or received from various data sources over a period of time. Specifically, notification data, location data, and proximity signature data are generated/received over a period of time of ten time units. A time unit may be, e.g., a millisecond, a second, a minute, etc., and may indicate the length of time over which the data was generated/received or the moment in time (e.g., a timestamp) that the data was generated/received. In the example of FIG. 8A, the time window is the time period of ten time units. As illustrated in FIG. 8A, notifications are generated/received at times 1 and 10, location data is generated/received at time 1, 3, 4, 9, and 10, and proximity signatures are generated/received at times 1-3 and 5-9.

FIG. 8B is an exemplary table 800B of the sample data in table 800A of FIG. 8A pre-processed, or pre-analyzed, according to an aspect of the disclosure. Table 800B shows a vector describing the data generated by or received from the respective data sources during the time window of ten time units. As illustrated in FIG. 8B, the vector includes a count of the notifications (i.e., 2), an average of the location data (i.e., 36, −115.128), and the centroids around which the proximity signatures were clustered (i.e., 0.4733, 0.51, and 0.545).

FIG. 8C is an exemplary table 800C of sample pre-processed, or pre-analyzed, data according to an aspect of the disclosure. Each row of table 800C shows the vector corresponding to the data generated by or received from the data sources providing notifications, location tracking, and proximity signatures over three consecutive time windows of ten time units each. As shown in table 800C, the first row corresponds to the vector shown in table 800B of FIG. 8B. The second and third rows correspond to vectors describing the same data type for subsequent time windows. Specifically, from times 11-20, the second vector includes a count of the notifications (i.e., 4), an average of the location data (i.e., 36, −115.32), and the centroids around which the proximity signatures were clustered (i.e., 0.48, 0.52, and 0.56). From times 21-30, the third vector also includes a count of the notifications (i.e., 3), an average of the location data (i.e., 36, −115.14), and the centroids around which the proximity signatures were clustered (i.e., 0.47, 0.515, and 0.545).

Although FIGS. 8A-C illustrate three data sources and a single vector describing the data received from all three data sources, it will be appreciated that there may be any number of data sources and that a single vector may describe the data generated by or received from all or less than all of these data sources. Similarly, while FIGS. 8A-C illustrate time windows of ten time units, it will be appreciated that the time window may be any number of time units, including a single time unit.

Figure 9A:
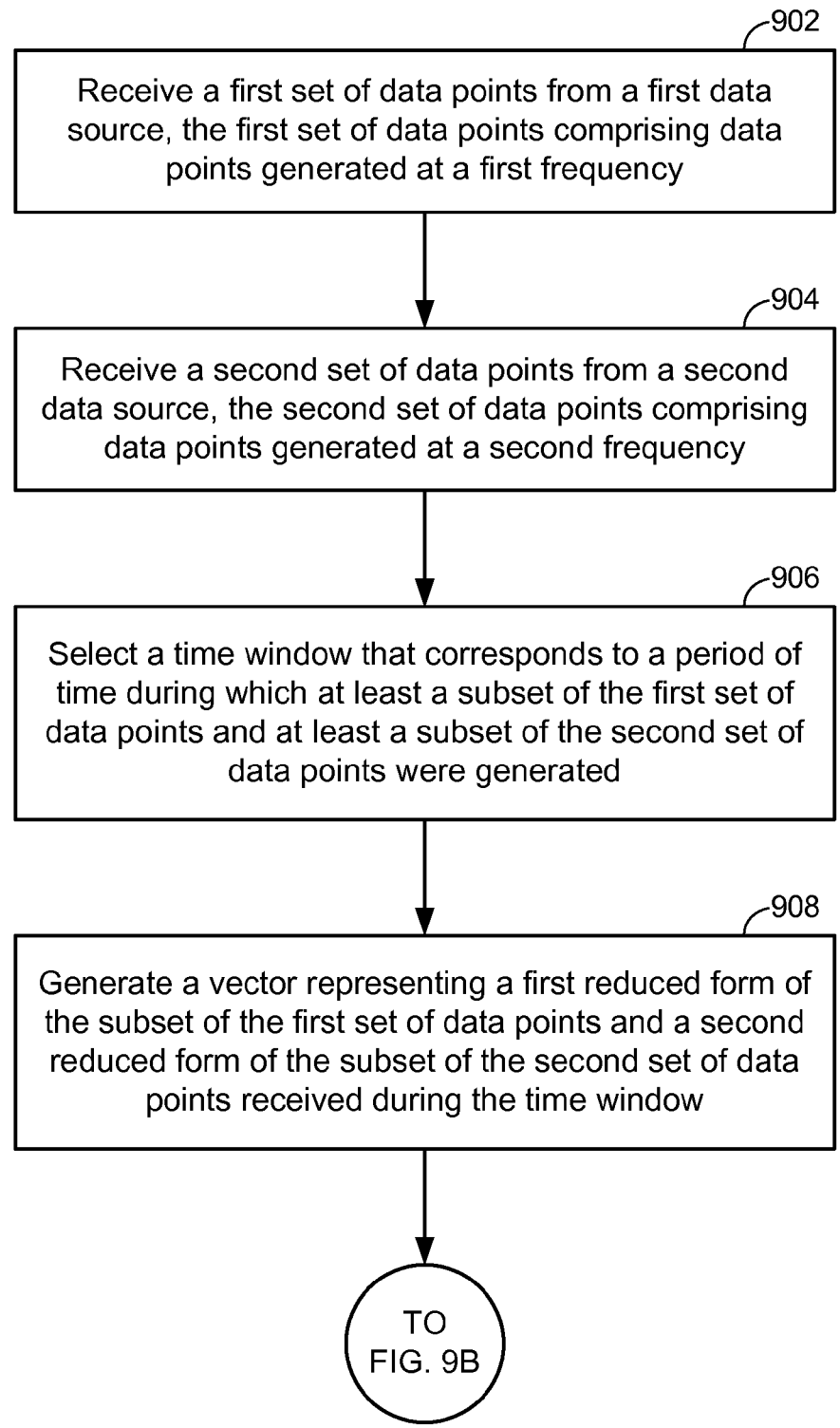
FIGS. 9A and 9B illustrate an exemplary flow for processing data inputs from multiple data sources at a device.
Figure 9B:
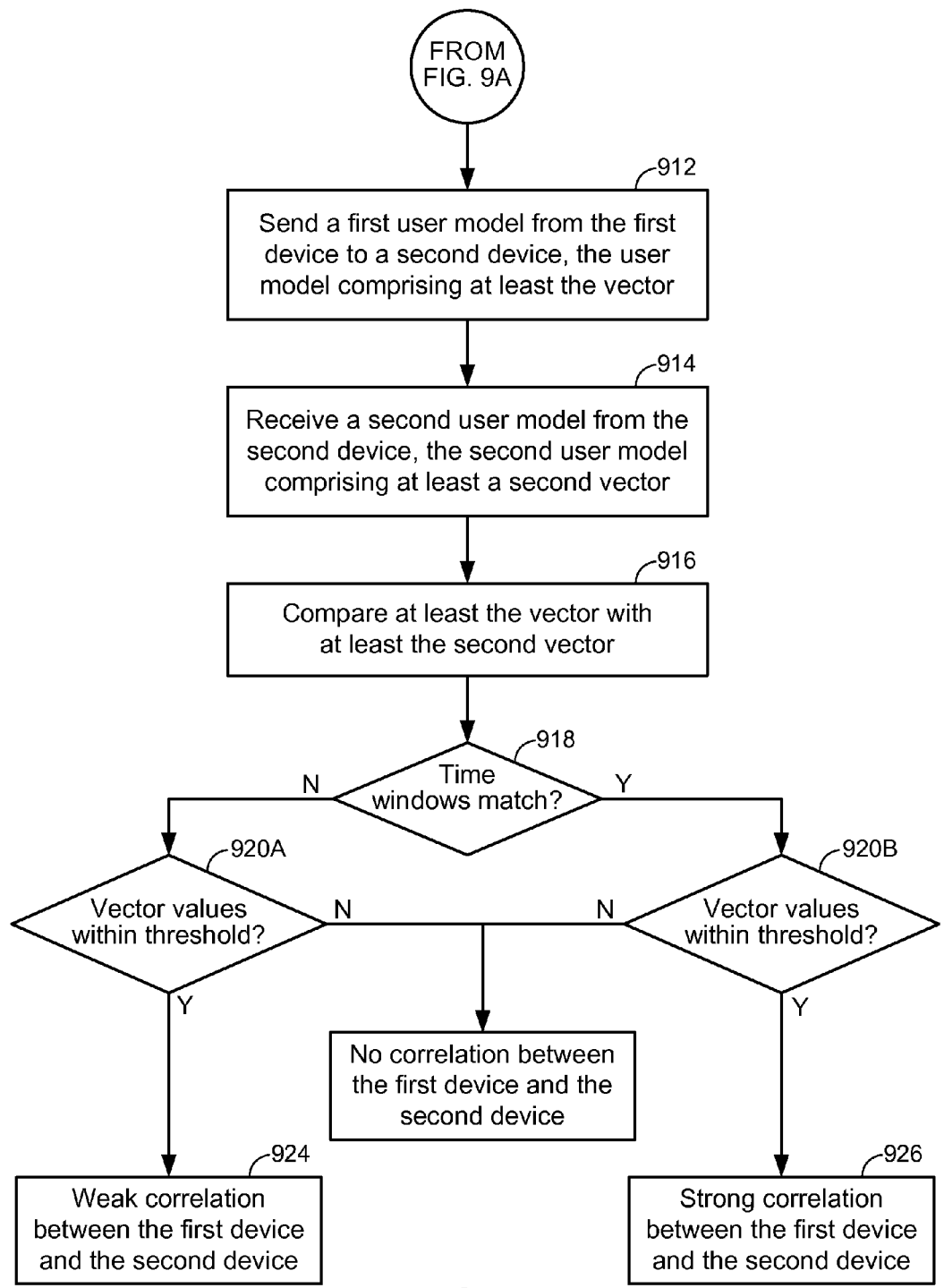

FIGS. 9A and 9B illustrate an exemplary flow for processing data inputs from multiple data sources at a device. The device may be any device capable of performing the features described herein, such as UE 200A or 200B of FIG. 2, communication device 300 of FIG. 3, server 400 of FIG. 4, or devices A 610, B 620, or C 630 of FIG. 6, for example. Specifically, a device capable of performing the functionality described herein may be a device having a model generator module and a model sharing module, such as model generator module 216 and model sharing module, respectively, in FIG. 2.

Referring to FIG. 9A, at 902, the device (specifically the model generator module 216 in conjunction with the ASIC 208 where the device corresponds to UE 200A or 200B) receives a first set of data points from a first data source. The data source may be any sensor of a device, such as an accelerometer, a temperature sensor, a light sensor, an antenna for monitoring local RF signals, an application generating notifications, a GPS receiver, etc. The data may come from the device's own sensor(s), or be generated by the sensor(s) of another device and received from that device. The first set of data points may be data points generated at a first frequency. For example, as illustrated in FIG. 8A, notifications are generated at times 1 and 10, location data is generated at time 1, 3, 4, 9, and 10, and proximity signatures are generated at times 1-3 and 5-9.

At 904, the device (specifically the model generator module 216 in conjunction with the ASIC 208 where the device corresponds to UE 200A or 200B) receives a second set of data points from a second data source. As with the first data source, the second data source may be any sensor of a device, and the data points may be generated by the device's own sensor(s) or the sensor(s) of another device. The second set of data points may be data points generated at a second frequency, which may be different than the first frequency.

At 906, the device (specifically the model generator module 216 in conjunction with the ASIC 208 where the device corresponds to UE 200A or 200B) selects a time window that corresponds to a period of time during which at least a subset of the first set of data points and at least a subset of the second set of data points were generated and/or received. The device may select the time window based on one or more environmental factors related to the first set of data points and/or the second set of data points, such as a time of day during which the first set of data points and/or the second set of data points were generated.

Alternatively or additionally, the device may select the time window based on a quantity of the first set of data points and/or the second set of data points. The quantity of the first set of data points and/or the second set of data points may be a maximum or a minimum count of the first set of data points and/or the second set of data points. For example, as illustrated in FIG. 8B, the time window of ten time units may have been chosen because it includes at least two data points (a minimum threshold) from the notifications data source.

At 908, the device (specifically the model generator module 216 in conjunction with the ASIC 208 where the device corresponds to UE 200A or 200B) generates a vector representing a first reduced form of the subset of the first set of data points and a second reduced form of the subset of the second set of data points received during the time window. In an aspect, the generating may include clustering the subset of the first set of data points and/or the subset of the second set of data points, determining one or more cluster centroids of the clustered subset of the first set of data points and/or the clustered subset of the second set of data points, and setting the one or more cluster centroids as the reduced form of the subset of the first set of data points and/or the reduced form of the subset of the second set of data points represented by the vector, as illustrated by the proximity signature column of table 800B in FIG. 8B.

In another aspect, the generating may include determining a count of the subset of the first set of data points and/or the subset of the second set of data points and setting the count as the reduced form of the subset of the first set of data points and/or the reduced form of the subset of the second set of data points represented by the vector, as illustrated by the notifications column of table 800B in FIG. 8B. In yet another aspect, the generating may include determining an average value of the subset of the first set of data points and/or the subset of the second set of data points and setting the average value as the reduced form of the subset of the first set of data points and/or the reduced form of the subset of the second set of data points represented by the vector, as illustrated by the location column of table 800B in FIG. 8B.

Thus, as illustrated in FIG. 8B, the reduced form of the notification data is a count of the notifications (i.e., 2), the reduced form of the location data is an average of the location data (i.e., 36, −115.128), and the reduced form of the proximity signature data is the centroids around which the proximity signatures were clustered (i.e., 0.4733, 0.51, and 0.545).

Although not illustrated in FIG. 9A, the device may select a second time window that corresponds to a period of time during which at least a second subset of the first set of data points and at least a second subset of the second set of data points were generated. The device may then generate a second vector representing a reduced form of the second subset of the first set of data points and a reduced form of the second subset of the second set of data points received during the second time window. For example, as illustrated in FIG. 8C, the second and third vectors represent the reduced form of second and third subsets, respectively, of the data points generated by or received from the notifications data source, the location data source, and the proximity signature data source.

After one or more vectors have been generated as illustrated in FIG. 9A, the device can share these vectors with other devices to identify potential relationships between the devices or the users of the devices. Specifically, devices can share models among themselves and compare these models based on a time component. If a match is found, this indicates a very strong correlation, such as the devices having been in the same place at the same time. If a match is not found, the devices can remove the time component and re-compare. If a match is found, it indicates a weaker correlation, and may be indicative of the devices having been in the same place but at different times.

Referring to FIG. 9B, at 912, the device (specifically the model sharing module 218 in conjunction with the transceiver 206 where the device corresponds to UE 200A or 200B) may send a first user model to a second device. The user model may be at least the vector generated at 908 of FIG. 9A. At 914, the device (specifically the model sharing module 218 in conjunction with the transceiver 206 where the device corresponds to UE 200A or 200B) may also receive a second user model from the second device. The second user model may be at least a second vector, and the second vector may represent a reduced form of a subset of a third set of data points and a reduced form of a subset of a fourth set of data points received during a second time window. The third and fourth sets of data points may be the same type of data points as the first and second sets of data points, respectively.

In an aspect, the first user model may be a plurality of vectors representing reduced forms of the first set of data points and reduced forms of the second set of data points, where the first set of data points and the second set of data points are received during a plurality of time windows, and each vector of the plurality of vectors corresponds to a time window. Likewise, the second user model may be a plurality of vectors representing reduced forms of the third set of data points and reduced forms of the fourth set of data points, where the third set of data points and the fourth set of data points are received during a plurality of time windows, and each vector of the plurality of vectors corresponds to a time window.

At 916, the device (specifically the model sharing module 218 in conjunction with the ASIC 208 where the device corresponds to UE 200A or 200B) may then compare at least the generated vector with at least the second vector. The device may compare only vectors or vector values that correspond to the same type of data sources. For example, if a locally generated vector contains values representing the reduced form of accelerometer data, temperature data, and location data, and a received vector contains values representing the reduced form of accelerometer data, notification data, and location data, the device will only compare the vector values representing the reduced form of the accelerometer data and the location data, since it is likely that no meaningful comparison could be made of the notification data and the temperature data. As another example, if the device generates two vectors, one representing the reduced forms of accelerometer data and location data and the other representing the reduced forms of notification data and access point data, and receives two vectors, one representing the reduced forms of accelerometer data and location data and the other representing the reduced forms of notification data and access point data, the device will compare the vectors representing the reduced forms of accelerometer data and location data and the vectors representing the reduced forms of the notification data and access point data.

At 918, the device (specifically the model sharing module 218 in conjunction with the ASIC 208 where the device corresponds to UE 200A or 200B) determines whether the time window is within a threshold period of time of the second time window (i.e., the time window during which the second vector received at 914 represents the reduced form of the subset of the third set of data points and the reduced form of the subset of the fourth set of data points). That is, the device determines whether or not the time window of at least one of the vectors generated at 908 of FIG. 9A overlaps with the time window of at least one of the vectors received at 914 by at least a threshold amount.

Regardless of the outcome of the determination at 918, the device determines whether the reduced form of the subset of the first set of data points and/or the reduced form of the subset of the second set of data points are within a threshold value of the reduced form of the subset of the third set of data points and/or the reduced form of the subset of the fourth set of data points (illustrated as 920A and 920B). If they are not, then at 922, the device determines that there is no correlation between itself and the second device, or at least that it cannot determine whether or not there is a correlation between itself and the second device.

Alternatively, if the device determines that the time windows are not within a threshold period of time of each other at 918 but the reduced form of the subset of the first set of data points and/or the reduced form of the subset of the second set of data points are within a threshold value of the reduced form of the subset of the third set of data points and/or the reduced form of the subset of the fourth set of data points at 920A, then at 924, the device determines that there is a weak correlation between itself and the second device. A weak correlation may indicate that the devices were at the same place and/or doing the same thing, but not at the same time.

If, however, the device determines that the time windows are within a threshold period of time of each other at 918 and the reduced form of the subset of the first set of data points and/or the reduced form of the subset of the second set of data points are within a threshold value of the reduced form of the subset of the third set of data points and/or the reduced form of the subset of the fourth set of data points at 920B, then at 926, the device determines that there is a strong correlation between itself and the second device. A strong correlation may indicate that the devices were at the same place and/or doing the same thing at substantially the same time.

Figure 10:
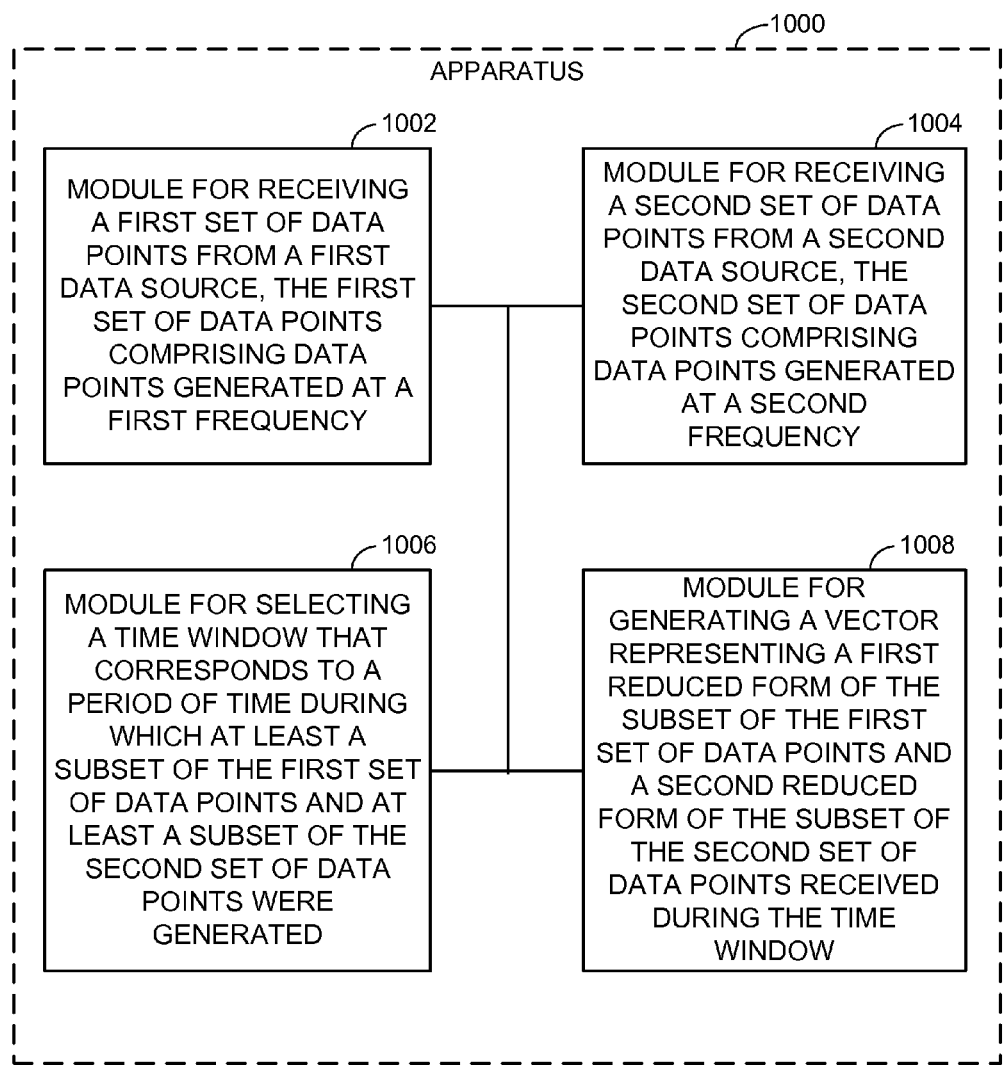
FIGS. 10-11 are other simplified block diagrams of several sample aspects of apparatuses configured to support communication as taught herein.

FIG. 10 illustrates an example apparatus 1000 represented as a series of interrelated functional modules. A module for receiving 1002 may correspond at least in some aspects to, for example, a communication device, such as transceiver 206 or network access ports 404, or a processing system, such as ASIC 208 or processor 401, in conjunction with a model generator module, such as model generator module 216, as discussed herein. A module for receiving 1004 may correspond at least in some aspects to, for example, a communication device, such as transceiver 206 or network access ports 404, or a processing system, such as ASIC 208 or processor 401, in conjunction with a model generator module, such as model generator module 216, as discussed herein. A module for selecting 1006 may correspond at least in some aspects to, for example, a processing system, such as ASIC 208 or processor 401, in conjunction with a model generator module, such as model generator module 216, as discussed herein. A module for generating 1008 may correspond at least in some aspects to, for example, a processing system, such as ASIC 208 or processor 401, in conjunction with a model generator module, such as model generator module 216, as discussed herein.

Figure 11:
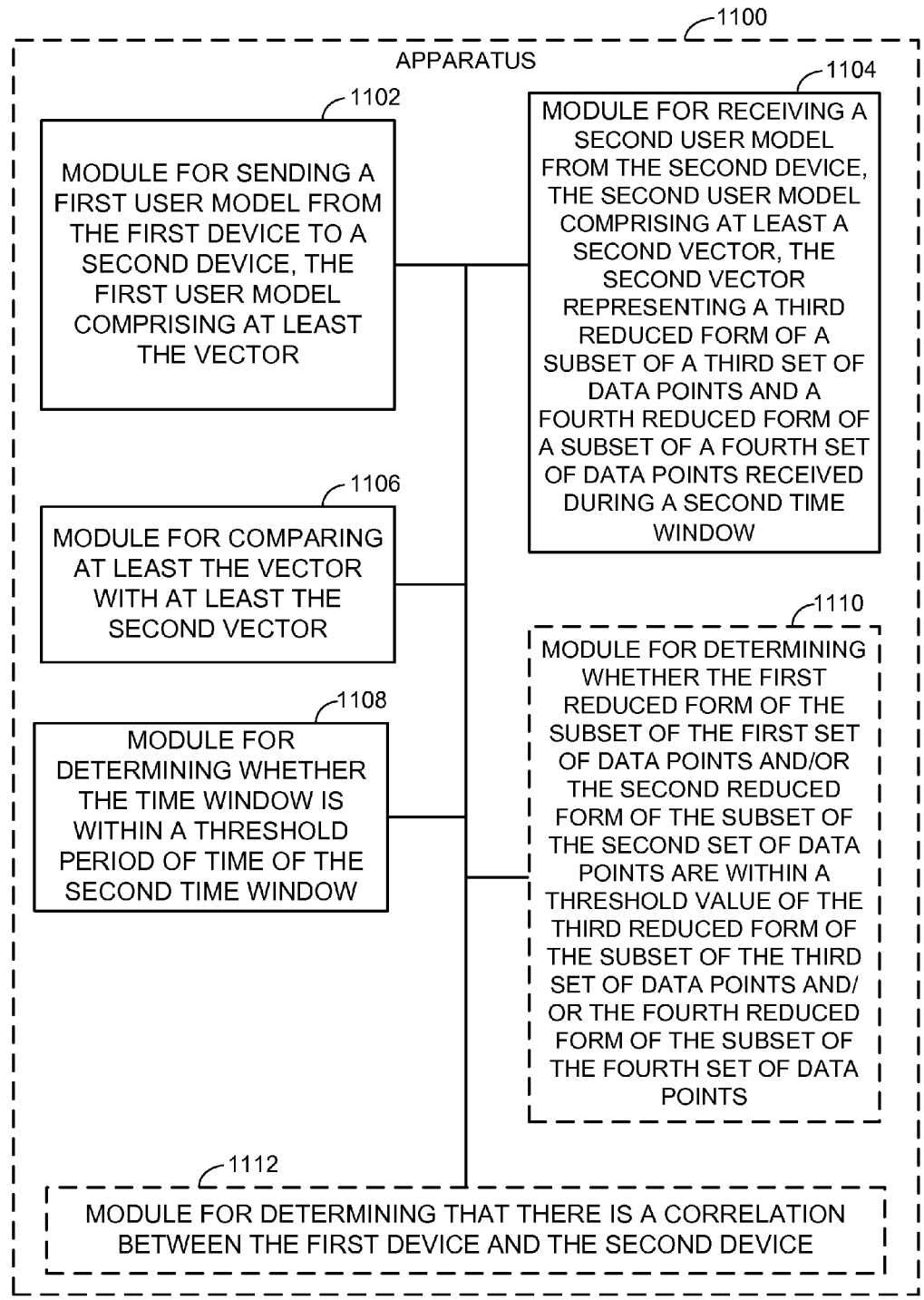

FIG. 11 illustrates an example apparatus 1100 represented as a series of interrelated functional modules. A module for sending 1102 may correspond at least in some aspects to, for example, a communication device, such as transceiver 206 or network access ports 404, as discussed herein. A module for receiving 1104 may correspond at least in some aspects to, for example, a communication device, such as transceiver 206 or network access ports 404, or a processing system, such as ASIC 208 or processor 401, in conjunction with a model sharing module, such as model sharing module 218, as discussed herein. A module for comparing 1106 may correspond at least in some aspects to, for example, a processing system, such as ASIC 208 or processor 401, in conjunction with a model sharing module, such as model sharing module 218, as discussed herein. A module for determining 1108 may correspond at least in some aspects to, for example, a processing system, such as ASIC 208 or processor 401, in conjunction with a model sharing module, such as model sharing module 218, as discussed herein. A module for determining 1110 may correspond at least in some aspects to, for example, a processing system, such as ASIC 208 or processor 401, in conjunction with a model sharing module, such as model sharing module 218, as discussed herein. A module for determining 1112 may correspond at least in some aspects to, for example, a processing system, such as ASIC 208 or processor 401, in conjunction with a model sharing module, such as model sharing module 218, as discussed herein.

The functionality of the modules of FIGS. 10-11 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 10-11, as well as other components and functions described herein, may be implemented using any suitable means. Such means also may be implemented, at least in part, using corresponding structure as taught herein. For example, the components described above in conjunction with the "module for" components of FIGS. 10-11 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method for synchronizing data inputs generated at a plurality of frequencies by a plurality of data sources of a first device, comprising:
   receiving, at a processor of the first device, a first set of data points from a first data source of the plurality of data sources, the first set of data points comprising data points generated at a first frequency of the plurality of frequencies;
   receiving, at the processor of the first device, a second set of data points from a second data source of the plurality of data sources, the second set of data points comprising data points generated at a second frequency of the plurality of frequencies;
   selecting, by the processor of the first device, a time window that corresponds to a period of time during which at least a subset of the first set of data points and at least a subset of the second set of data points were generated;
   generating, by the processor of the first device, a first user model comprising a vector representing a first reduced form of the subset of the first set of data points and a second reduced form of the subset of the second set of data points received during the time window;
   receiving, by the processor of the first device, a second user model from a second device, the second user model comprising at least a second vector, the second vector representing a third reduced form of a subset of a third set of data points and a fourth reduced form of a subset of a fourth set of data points received during a second time window; and
   determining, by the processor of the first device, whether there is a relationship between the first device and the second device based on a comparison of the first user model and the second user model.

2. The method of claim 1, wherein the time window is selected based on one or more environmental factors related to the first set of data points and/or the second set of data points.

3. The method of claim 2, wherein the one or more environmental factors comprise a time of day during which the first set of data points and/or the second set of data points were generated.

4. The method of claim 1, wherein the time window is selected based on a quantity of the first set of data points and/or the second set of data points.

5. The method of claim 4, wherein the quantity of the first set of data points and/or the second set of data points comprises a maximum or a minimum count of the first set of data points and/or the second set of data points.

6. The method of claim 1, wherein the generating comprises:
clustering the subset of the first set of data points and/or the subset of the second set of data points;
determining one or more cluster centroids of the clustered subset of the first set of data points and/or the clustered subset of the second set of data points; and
setting the one or more cluster centroids as the first reduced form of the subset of the first set of data points and/or the second reduced form of the subset of the second set of data points represented by the vector.

7. The method of claim 1, wherein the generating comprises:
determining a count of the subset of the first set of data points and/or the subset of the second set of data points; and
setting the count as the first reduced form of the subset of the first set of data points and/or the second reduced form of the subset of the second set of data points represented by the vector.

8. The method of claim 1, wherein the generating comprises:
determining an average value of the subset of the first set of data points and/or the subset of the second set of data points; and
setting the average value as the first reduced form of the subset of the first set of data points and/or the second reduced form of the subset of the second set of data points represented by the vector.

9. The method of claim 1, further comprising:
sending the first user model from the first device to the second device.

10. The method of claim 1, further comprising:
comparing at least the vector with at least the second vector;
determining whether the time window is within a threshold period of time of the second time window;
determining whether the first reduced form of the subset of the first set of data points and/or the second reduced form of the subset of the second set of data points are within a threshold value of the third reduced form of the subset of the third set of data points and/or the fourth reduced form of the subset of the fourth set of data points; and
based on the time window being within the threshold period of time of the second time window and the first reduced form of the subset of the first set of data points and/or the second reduced form of the subset of the second set of data points being within the threshold value of the third reduced form of the subset of the third set of data points and/or the fourth reduced form of the subset of the fourth set of data points, determining that there is a correlation between the first device and the second device.

11. The method of claim 1, wherein the first user model comprises a plurality of vectors, the plurality of vectors representing reduced forms of the first set of data points and reduced forms of the second set of data points, the first set of data points and the second set of data points received during a plurality of time windows, each vector of the plurality of vectors corresponding to a time window.

12. The method of claim 1, wherein the second user model comprises a plurality of vectors, the plurality of vectors representing reduced forms of the third set of data points and reduced forms of the fourth set of data points, the third set of data points and the fourth set of data points received during a plurality of time windows, each vector of the plurality of vectors corresponding to a time window.

13. The method of claim 1, further comprising:
selecting a third time window that corresponds to a period of time during which at least a second subset of the first set of data points and at least a second subset of the second set of data points were generated; and
generating a third vector representing a reduced form of the second subset of the first set of data points and a reduced form of the second subset of the second set of data points received during the third time window.

14. An apparatus for synchronizing data inputs generated at a plurality of frequencies by a plurality of data sources of a first device, comprising:
a processor of the first device configured to:
receive a first set of data points from a first data source of the plurality of data sources, the first set of data points comprising data points generated at a first frequency of the plurality of frequencies;
receive a second set of data points from a second data source of the plurality of data sources, the second set of data points comprising data points generated at a second frequency of the plurality of frequencies;
select a time window that corresponds to a period of time during which at least a subset of the first set of data points and at least a subset of the second set of data points were generated;
generate a first user model comprising a vector representing a first reduced form of the subset of the first set of data points and a second reduced form of the subset of the second set of data points received during the time window;
receive a second user model from a second device, the second user model comprising at least a second vector, the second vector representing a third reduced form of a subset of a third set of data points and a fourth reduced form of a subset of a fourth set of data points received during a second time window; and
determine whether there is a relationship between the first device and the second device based on a comparison of the first user model and the second user model.

15. The apparatus of claim 14, wherein the processor being configured to select the time window comprises the processor being configured to select the time window based on one or more environmental factors related to the first set of data points and/or the second set of data points.

16. The apparatus of claim 15, wherein the one or more environmental factors comprise a time of day during which the first set of data points and/or the second set of data points were generated.

17. The apparatus of claim 14, wherein the processor being configured to select the time window comprises the processor being configured to select the time window based on a quantity of the first set of data points and/or the second set of data points.

18. The apparatus of claim 17, wherein the quantity of the first set of data points and/or the second set of data points comprises a maximum or a minimum count of the first set of data points and/or the second set of data points.

19. The apparatus of claim 14, wherein the processor being configured to generate comprises the processor being configured to:

cluster the subset of the first set of data points and/or the subset of the second set of data points;

determine one or more cluster centroids of the clustered subset of the first set of data points and/or the clustered subset of the second set of data points; and set the one or more cluster centroids as the first reduced form of the subset of the first set of data points and/or the second reduced form of the subset of the second set of data points represented by the vector.

20. The apparatus of claim 14, wherein the processor being configured to generate comprises the processor being configured to:

determine a count of the subset of the first set of data points and/or the subset of the second set of data points; and set the count as the first reduced form of the subset of the first set of data points and/or the second reduced form of the subset of the second set of data points represented by the vector.

21. The apparatus of claim 14, wherein the processor being configured to generate comprises the processor being configured to:

determine an average value of the subset of the first set of data points and/or the subset of the second set of data points; and set the average value as the first reduced form of the subset of the first set of data points and/or the second reduced form of the subset of the second set of data points represented by the vector.

22. The apparatus of claim 14, further comprising: a transceiver configured to send the first user model from the first device to the second device.

23. The apparatus of claim 14, wherein the processor is further configured to:

compare at least the vector with at least the second vector;

determine whether the time window is within a threshold period of time of the second time window;

determine whether the first reduced form of the subset of the first set of data points and/or the second reduced form of the subset of the second set of data points are within a threshold value of the third reduced form of the subset of the third set of data points and/or the fourth reduced form of the subset of the fourth set of data points; and determine that there is a correlation between the first device and the second device based on the time window being within the threshold period of time of the second time window and the first reduced form of the subset of the first set of data points and/or the second reduced form of the subset of the second set of data points being within the threshold value of the third reduced form of the subset of the third set of data points and/or the fourth reduced form of the subset of the fourth set of data points.

24. The apparatus of claim 14, wherein the first user model comprises a plurality of vectors, the plurality of vectors representing reduced forms of the first set of data points and reduced forms of the second set of data points, the first set of data points and the second set of data points received during a plurality of time windows, each vector of the plurality of vectors corresponding to a time window.

25. The apparatus of claim 14, wherein the second user model comprises a plurality of vectors, the plurality of vectors representing reduced forms of the third set of data points and reduced forms of the fourth set of data points, the third set of data points and the fourth set of data points received during a plurality of time windows, each vector of the plurality of vectors corresponding to a time window.

26. The apparatus of claim 14, wherein the processor is further configured to:

select a third time window that corresponds to a period of time during which at least a second subset of the first set of data points and at least a second subset of the second set of data points were generated; and generate a third vector representing a reduced form of the second subset of the first set of data points and a reduced form of the second subset of the second set of data points received during the third time window.

27. An apparatus for synchronizing data inputs generated at a plurality of frequencies by a plurality of data sources of a first device, comprising:

means for processing of the first device configured to:

receive a first set of data points from a first data source of the plurality of data sources, the first set of data points comprising data points generated at a first frequency of the plurality of frequencies;

receive a second set of data points from a second data source of the plurality of data sources, the second set of data points comprising data points generated at a second frequency of the plurality of frequencies;

select a time window that corresponds to a period of time during which at least a subset of the first set of data points and at least a subset of the second set of data points were generated;

generate a first user model comprising a vector representing a first reduced form of the subset of the first set of data points and a second reduced form of the subset of the second set of data points received during the time window;

receive a second user model from a second device, the second user model comprising at least a second vector, the second vector representing a third reduced form of a subset of a third set of data points and a fourth reduced form of a subset of a fourth set of data points received during a second time window; and determine whether there is a relationship between the first device and the second device based on a comparison of the first user model and the second user model.

28. The apparatus of claim 27, further comprising means for sending the first user model from the first device to the second device.

29. The apparatus of claim 27, wherein the means for processing is further configured to:

compare at least the vector with at least the second vector;

determine whether the time window is within a threshold period of time of the second time window;

determine whether the first reduced form of the subset of the first set of data points and/or the second reduced form of the subset of the second set of data points are within a threshold value of the third reduced form of the subset of the third set of data points and/or the fourth reduced form of the subset of the fourth set of data points; and determine that there is a correlation between the first device and the second device based on the time window being within the threshold period of time of the second time window and the first reduced form of the subset of the first set of data points and/or the second reduced form of the subset of the second set of data points being within the threshold value of the third reduced form of the subset of the third set of data points and/or the fourth reduced form of the subset of the fourth set of data points.

30. A non-transitory computer-readable medium for synchronizing data inputs generated at a plurality of frequencies by a plurality of data sources of a first device, comprising:

at least one instruction instructing a processor of the first device to receive a first set of data points from a first data source of the plurality of data sources, the first set of data points comprising data points generated at a first frequency of the plurality of frequencies;

at least one instruction instructing the processor of the first device to receive a second set of data points from a second data source of the plurality of data sources, the second set of data points comprising data points generated at a second frequency of the plurality of frequencies;

at least one instruction instructing the processor of the first device to select a time window that corresponds to a period of time during which at least a subset of the first set of data points and at least a subset of the second set of data points were generated; and at least one instruction instructing the processor of the first device to generate a first user model comprising a vector representing a first reduced form of the subset of the first set of data points and a second reduced form of the subset of the second set of data points received during the time window;

at least one instruction instructing the processor of the first device to receive a second user model from a second device, the second user model comprising at least a second vector, the second vector representing a third reduced form of a subset of a third set of data points and a fourth reduced form of a subset of a fourth set of data points received during a second time window; and at least one instruction instructing the processor of the first device to determine whether there is a relationship between the first device and the second device based on a comparison of the first user model and the second user model.

* * * * *